(12) United States Patent
Montgomerie et al.

(10) Patent No.: US 12,513,130 B2
(45) Date of Patent: Dec. 30, 2025

(54) AUTHENTICATED INTERFACE ELEMENT INTERACTIONS

(71) Applicant: Apple Inc., Cupertino, CA (US)

(72) Inventors: James R. Montgomerie, Sunnyvale, CA (US); Jessica Aranda, Cupertino, CA (US); Patrick Coffman, San Francisco, CA (US); Julien Freudiger, San Francisco, CA (US); Matthew H. Gamble, Mill Valley, CA (US); Ron Huang, San Jose, CA (US); Anant Jain, San Francisco, CA (US); Glen S. Low, Los Gatos, CA (US); Andrey Pokrovskiy, Mountain View, CA (US); Stephen J. Rhee, San Jose, CA (US); Matthew E. Shepherd, Mountain View, CA (US); Ansh Shukla, Cupertino, CA (US); Katherine Skinner, San Francisco, CA (US); Kyle M. Sluder, San Francisco, CA (US); Christopher Soli, San Francisco, CA (US); Christopher K. Thomas, Sunnyvale, CA (US); Guy L. Tribble, Woodside, CA (US); John Wilander, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/414,421

(22) Filed: Jan. 16, 2024

(65) Prior Publication Data

US 2024/0187395 A1 Jun. 6, 2024

Related U.S. Application Data

(63) Continuation of application No. 17/162,955, filed on Jan. 29, 2021, now Pat. No. 11,895,105.

(Continued)

(51) Int. Cl.
*H04L 9/40* (2022.01)
*G06F 21/10* (2013.01)
*H04W 12/06* (2021.01)

(52) U.S. Cl.
CPC .......... *H04L 63/0807* (2013.01); *G06F 21/10* (2013.01); *H04L 63/083* (2013.01); *H04L 63/0853* (2013.01); *H04W 12/06* (2013.01)

(58) Field of Classification Search
CPC ..... H04W 12/02; H04W 12/06; H04W 12/63; H04L 63/0853; H04L 63/0807; H04L 63/083

See application file for complete search history.

(56) References Cited

U.S. PATENT DOCUMENTS 6,633,981 B1 10/2003 Davis
7,950,066 B1 5/2011 Zuili
(Continued)

FOREIGN PATENT DOCUMENTS

CN 105378744 A 3/2016

OTHER PUBLICATIONS

Ataei, Mehrnaz, Auriol Degbelo, and Christian Kray. "Privacy theory in practice: designing a user interface for managing location privacy on mobile devices." (2018). (Year: 2018).*

(Continued)

*Primary Examiner* — Kari L Schmidt
(74) *Attorney, Agent, or Firm* — BAKERHOSTETLER

(57) ABSTRACT

An access control system is provided to prevent the surreptitious granting of access to privacy related functionality on an electronic device. Software-based events to grant access to device functionality can be validated by confirming that the software event corresponds with a hardware input event.

(Continued)

This validation prevents the spoofing of a user interface input that may be used to fraudulently grant access to specific functionality.

20 Claims, 21 Drawing Sheets

Related U.S. Application Data

(60) Provisional application No. 63/041,797, filed on Jun. 19, 2020.

(56) References Cited

U.S. PATENT DOCUMENTS

| | | | |
|---|---|---|---|
| 8,347,083 B1 | 1/2013 | Scudder | |
| 8,572,716 B2 | 10/2013 | Chander | |
| 8,656,461 B2 | 2/2014 | Kaza et al. | |
| 8,775,248 B1 | 7/2014 | Saidanha | |
| 8,881,302 B1 | 11/2014 | Ace | |
| 8,955,084 B2 | 2/2015 | Do | |
| 9,161,155 B2* | 10/2015 | Roh | H04W 4/02 |
| 9,179,316 B2* | 11/2015 | Raleigh | G06Q 30/0207 |
| 9,369,441 B2 | 6/2016 | Lal | |
| 9,953,254 B2 | 4/2018 | Li et al. | |
| 10,042,680 B2 | 8/2018 | Major et al. | |
| 11,171,989 B1* | 11/2021 | Kim | H04L 63/108 |
| 11,223,629 B2* | 1/2022 | Moon | G06F 21/629 |
| 11,895,105 B2* | 2/2024 | Montgomerie | H04L 63/0807 |
| 2002/0002673 A1* | 1/2002 | Narin | G06F 21/53 |
| | | | 713/152 |
| 2003/0163810 A1 | 8/2003 | Iijima | |
| 2005/0060575 A1* | 3/2005 | Trethewey | H04W 12/02 |
| | | | 726/4 |
| 2005/0091510 A1* | 4/2005 | McKeon | G06F 9/451 |
| | | | 713/185 |
| 2006/0101128 A1* | 5/2006 | Waterson | G06F 21/52 |
| | | | 709/212 |
| 2007/0073743 A1* | 3/2007 | Bammi | G06Q 10/00 |
| 2007/0240212 A1 | 10/2007 | Matalytski | |
| 2007/0294271 A1* | 12/2007 | Bammi | G06F 21/552 |
| 2008/0207165 A1* | 8/2008 | Eckhart | H04W 4/02 |
| | | | 455/410 |
| 2011/0190009 A1* | 8/2011 | Gerber, Jr. | H04W 12/02 |
| | | | 455/456.3 |
| 2012/0079282 A1 | 3/2012 | Lowenstein | |
| 2012/0144285 A1 | 6/2012 | Bach | |
| 2012/0173315 A1 | 7/2012 | Martini et al. | |
| 2012/0204250 A1 | 8/2012 | Anderson | |
| 2013/0024929 A1 | 1/2013 | Abraham et al. | |
| 2013/0125228 A1 | 5/2013 | Do et al. | |
| 2013/0219479 A1 | 8/2013 | DeSoto | |
| 2014/0059695 A1* | 2/2014 | Parecki | H04W 12/08 |
| | | | 726/26 |
| 2014/0068702 A1 | 3/2014 | Hyndman | |
| 2015/0074716 A1 | 3/2015 | Redmann | |
| 2015/0121535 A1* | 4/2015 | Fiss | G06F 21/6218 |
| | | | 726/26 |
| 2015/0205962 A1 | 7/2015 | Swidowski et al. | |
| 2016/0306964 A1 | 10/2016 | Austin et al. | |
| 2016/0342433 A1 | 11/2016 | Rencs | |
| 2016/0353237 A1* | 12/2016 | Shepherd | H04W 4/02 |
| 2017/0079099 A1 | 3/2017 | Yao | |
| 2018/0019870 A1 | 1/2018 | Scagnol | |
| 2018/0213059 A1 | 7/2018 | Alsina et al. | |
| 2020/0019418 A1* | 1/2020 | P K | G06F 9/453 |
| 2020/0120480 A1* | 4/2020 | Chu | H04W 4/02 |
| 2020/0396221 A1 | 12/2020 | Shaffer | |
| 2021/0152345 A1 | 5/2021 | Beloskur | |
| 2022/0368705 A1 | 11/2022 | Klawe | |

OTHER PUBLICATIONS

J. Kang, D. Steiert, D. Lin and Y. Fu, "MoveWithMe: Location Privacy Preservation for Smartphone Users," in IEEE Transactions on Information Forensics and Security, vol. 15, pp. 711-724, 2020. (Year: 2020).*

Herzberg, Amir, and Ahmad Jbara. "Security and identification indicators for browsers against spoofing and phishing attacks." ACM Transactions on Internet Technology (TOIT) 8.4 (2008): 1-36. (Year: 2008).*

European Intention to Grant from European Patent Application No. 21732769.1, dated Mar. 19, 2024, 5 pages.

International Search Report and Written Opinion from PCT/US2021/033904, dated Aug. 11, 2021, 14 pages.

Liu, et al., "VeriUI: Attested Login for Mobile Devices," 2014, Proceedings of the 15th workshop on mobile computing systems and applications, 6 pages.

Scopelliti, eta I., "End-to-End Security for Distributed Event-driven Enclave Applications on Heterogeneous TEEs," Aug. 2023, ACM Trans. Priv. Secur., 26, 3, Article 39, 46 pages.

Wu, et al., "Effective Defense Schemes for Phishing Attacks on Mobile Computing Platforms," Aug. 2015, IEEE Transactions on Vehicular Technology, 65, 8, pp. 6678-6691.

Extended European Search Report from European Patent Application No. 24195432.0, dated Oct. 23, 2024, 10 pages.

Roesner et al., "User-Driven Access Control: Rethinking Permission Granting in Modern Operating Systems," IEEE Symposium on Security and Privacy, May 2012, pp. 224-238.

Chinese Patent Application No. 202180043382.4; Office Action dated Aug. 19, 2025, 16 pages with English language translation.

* cited by examiner

AUTHENTICATED INTERFACE ELEMENT INTERACTIONS

CROSS-REFERENCE

This application claims priority to U.S. Provisional Application No. 63/041,797 filed Jun. 19, 2020, the entire contents of which is incorporated herein by reference.

TECHNICAL FIELD

This disclosure relates generally to mobile electronic devices. More specifically, this disclosure relates to a system and associated methods for enabling access to protected functionality via authenticated interactions with user interface elements presented on a user interface of a mobile electronic device.

BACKGROUND

Restrictions may be placed on the ability of an application to access certain functionality provided by an electronic device. The restricted functionality may include access to privacy related data of the user or functionality of the mobile device that may be used to gather private user data. An operating system of the electronic device can include privacy controls that manage the restrictions that are placed on privacy related functionality. Such privacy controls can be used to enable or disable access to functionality provided by the electronic device. In general, privacy control systems are configured to limit access only to privacy related functionality that is explicitly granted by a user of the electronic device.

SUMMARY

Described herein is an access control system to prevent the surreptitious granting of access to privacy related functionality on an electronic device. Software-based events to grant access to device functionality can be validated by confirming that the software event corresponds with a hardware input event. This validation prevents the spoofing of a user interface input that may be used to fraudulently grant access to specific functionality.

One embodiment provides a method comprising displaying, via a display of an electronic device, a user interface element corresponding to a function of a process executing on one or more processors of the electronic device and receiving an indication of an interaction with the user interface element. The method further includes, in response to receiving the indication and in accordance with a determination that the indication corresponds to a hardware input event, sending, by a first component of the electronic device, an authentication token to a second component of the electronic device, verifying, by the second component, that the authentication token is valid, and after verifying that the authentication token is valid, initiating execution of the function.

One embodiment provides a non-transitory machine-readable medium storing instructions which, when executed by one or more processors, cause the one or more processors to perform operations comprising a method as described herein.

One embodiment provides a data processing system on an electronic device, the system comprising a display, a memory device, and one or more processors coupled with the memory device and the display. The one or more processors are configured to execute instructions stored in the memory device. The instructions cause the one or more processors to perform operations of a method as described herein.

Other features of the present embodiments will be apparent from the accompanying drawings and from the Detailed Description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
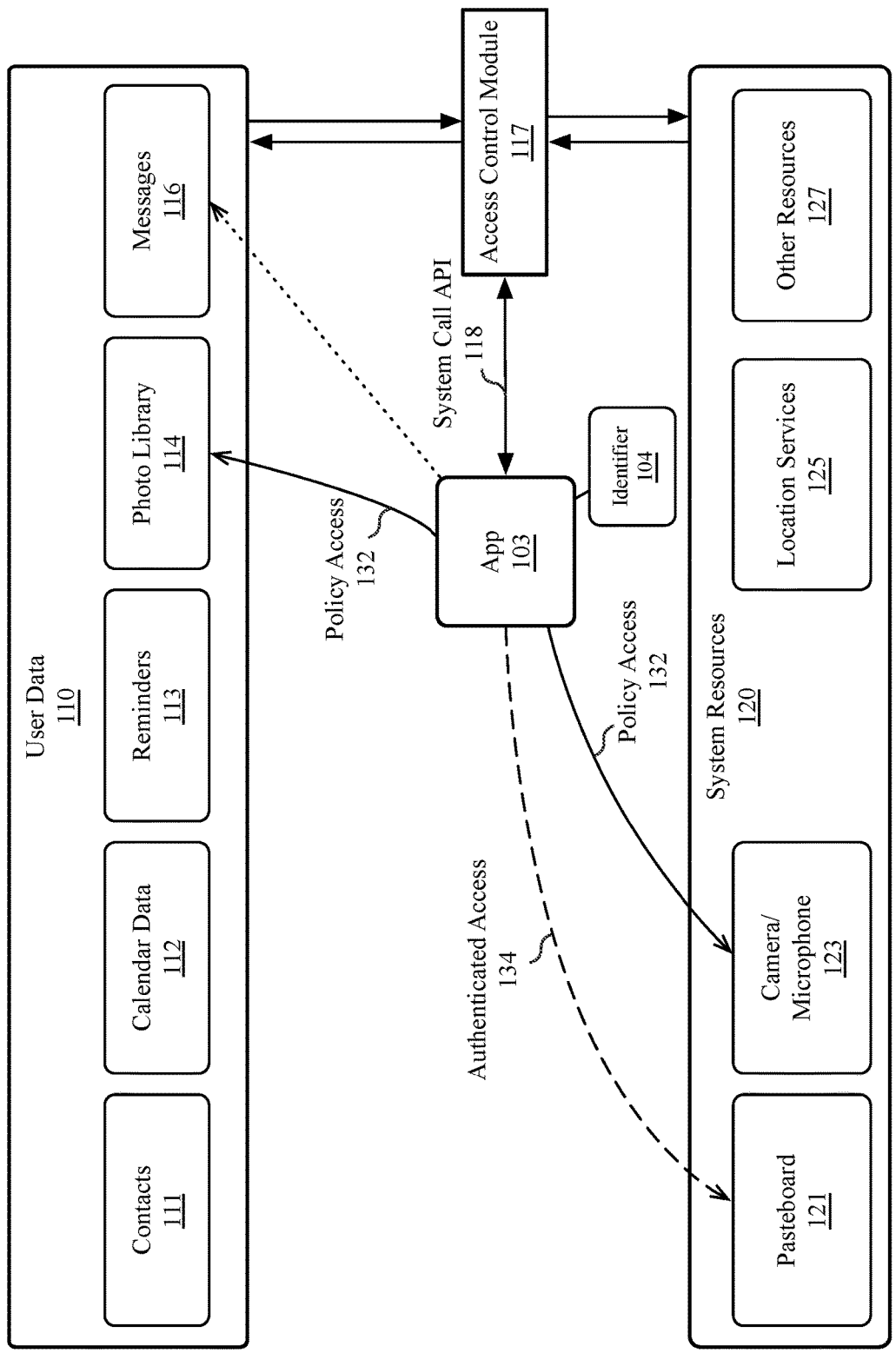
FIG. 1 illustrates an access control system for privacy sensitive data and hardware of a computing device.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, California.

In one embodiment, software events to grant access to device functionality are validated by confirming that the software event occurs in response to a hardware input event that is received via a hardware input device, such as but not limited to a touch screen interface, a touchpad interface, a hardware mouse, or a hardware keyboard. This validation prevents the software-based spoofing of a user interface input that may be used to fraudulently grant access to specific functionality by gating access to such functionality unless a hardware input event is received from a user of the electronic device. An application or operating system daemon can designate a user interface (UI) element or hotkey event as requiring validated input. The application or operating system daemon can designate the UI element or hotkey event by registering the UI element or hotkey event with a source daemon of the operating system that provides indication of incoming hardware events. In one embodiment, registration of the UI element or hotkey event can include an exchange of cryptographic material, such as a shared secret. A software event that indicates selection of the UI element or the input of a hotkey combination can provide an authentication token that is generated based on the shared secret. The authentication token can be verified validate the input event. In other embodiments, other registration and/or validation techniques may be used.

Authenticated interface element interactions are described for various functions using various authentication techniques, as provided by the various embodiments described herein. In one embodiment, access to location services on an electronic device are gated via an authenticated user interface interaction. In one embodiment, attribution data for an advertisement click is gated via an authenticated user interface interaction. In one embodiment, access to pasteboard memory is gated via an authenticated user interface interaction. The authenticated user interaction can be received from various input devices. For example, the authenticated user interaction can be a hardware touch event that is received via a touch screen interface. The authenticated user interaction can also be a hotkey event that is received from a physical keyboard. The authenticated user interaction can also be a click event that is received via touchpad or mouse peripheral. Other types of physical input interactions can also be supported.

FIG. 1 illustrates a system 100 in which access restrictions are imposed on applications, according to an embodiment. The system 100 includes user data 110 and system resources 120 that can be accessed by an application 103. In one embodiment, access to privacy sensitive user data 110 and system resources 120 is mediated by an access control module 117. User data 110 that is privacy sensitive can be grouped into different classifications including, but not limited to contacts 111, calendar data 112, reminders 113, a photo library 114, and messages 116, where the messages can include text (e.g., SMS) messages, email messages, and/or instant messages via an instant messaging application. System resources 120 that are privacy sensitive include but are not limited to a pasteboard 121, a camera/microphone 123, location services 125, and other resources 127, which can include software resources, hardware resources, or a combination thereof. Access to the user data 110 can be mediated on a per-classification level. Access to system resources 120 can be mediated on a per-resource level. Various additional types of privacy sensitive information can be protected by the system 100 as either a classification of user data 110 or other types of privacy sensitive system resources 120, including but not limited to message history, web browser data (e.g., browser history, cookie data, etc.), system backup data, and any type of location history data that may be stored by the system 100.

In one embodiment, the access control module 117 is a system daemon through which an application 103 can communicate with via a system call API 118, such as an inter-process communication (IPC) call. The application includes an identifier 104 that is used to identify the application to the access control module 117. In one embodiment, the identifier 104 is a universally unique identifier. In one embodiment, the identifier 104 is unique per-system. In one embodiment the identifier 104 is unique per-user.

An application 103 can be provided access to a limited set of resources by default. This default access can be a policy-based access (e.g., policy access 132) that is granted to the application 103 based on the standard functionality of the application. For example, if application 103 is a camera application, the application 103 can be given policy access 132 to a camera/microphone 123 and photo library 114 based on a policy associated with the application 103. The system 100 can be configured to disallow access to privacy sensitive system resources by default, except for those to which the application 103 is granted policy access 132. In one embodiment, before the application 103 is granted access to user data 110 or system resources 120 outside of policy, the access control module 117 can trigger a graphical interface prompt by which a user of the system can explicitly grant or deny access to the classification of user data 110 or system resources 120. For example, before application 103 can access the contacts 111 of a user, the application 103 performs a call through the system call API 118 to the access control module 117 to explicitly request access 134 to the contacts 111. The user can then grant or deny access to the contacts 111.

Explicit Authorization for Applications Before Granting Access to Select Functionality A system of explicit authorizations can be used to gate access to select privacy related functionality for an application. The authorization prompt may be displayed before an application is granted access to privacy related resources. The authorization prompt may also be displayed automatically in response to an attempt by an application to access privacy related resources.

Figure 2A:
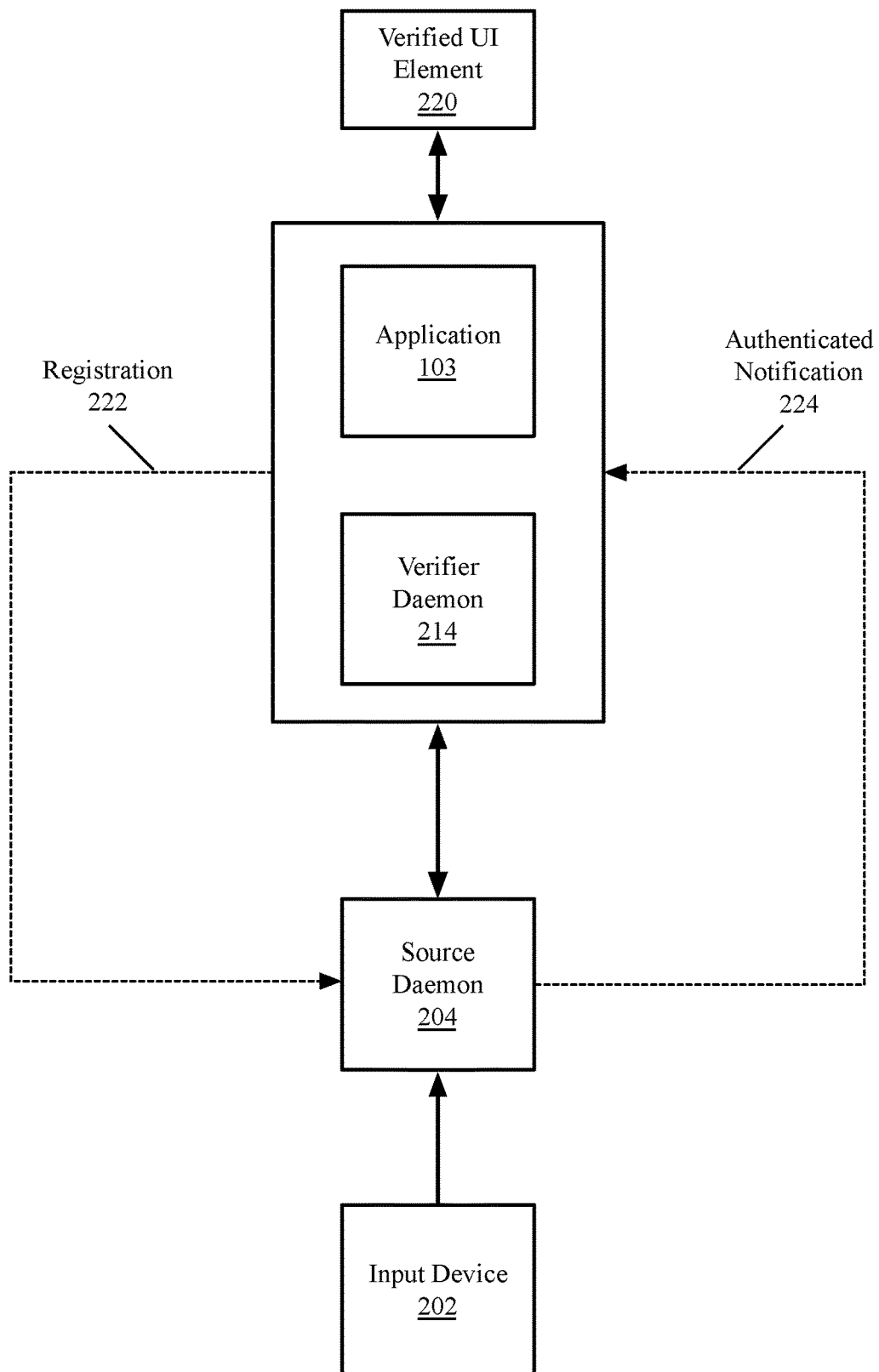
FIG. 2A-2B illustrate system to enable authenticated interface interactions for select functionality on an electronic device.
Figure 2B:
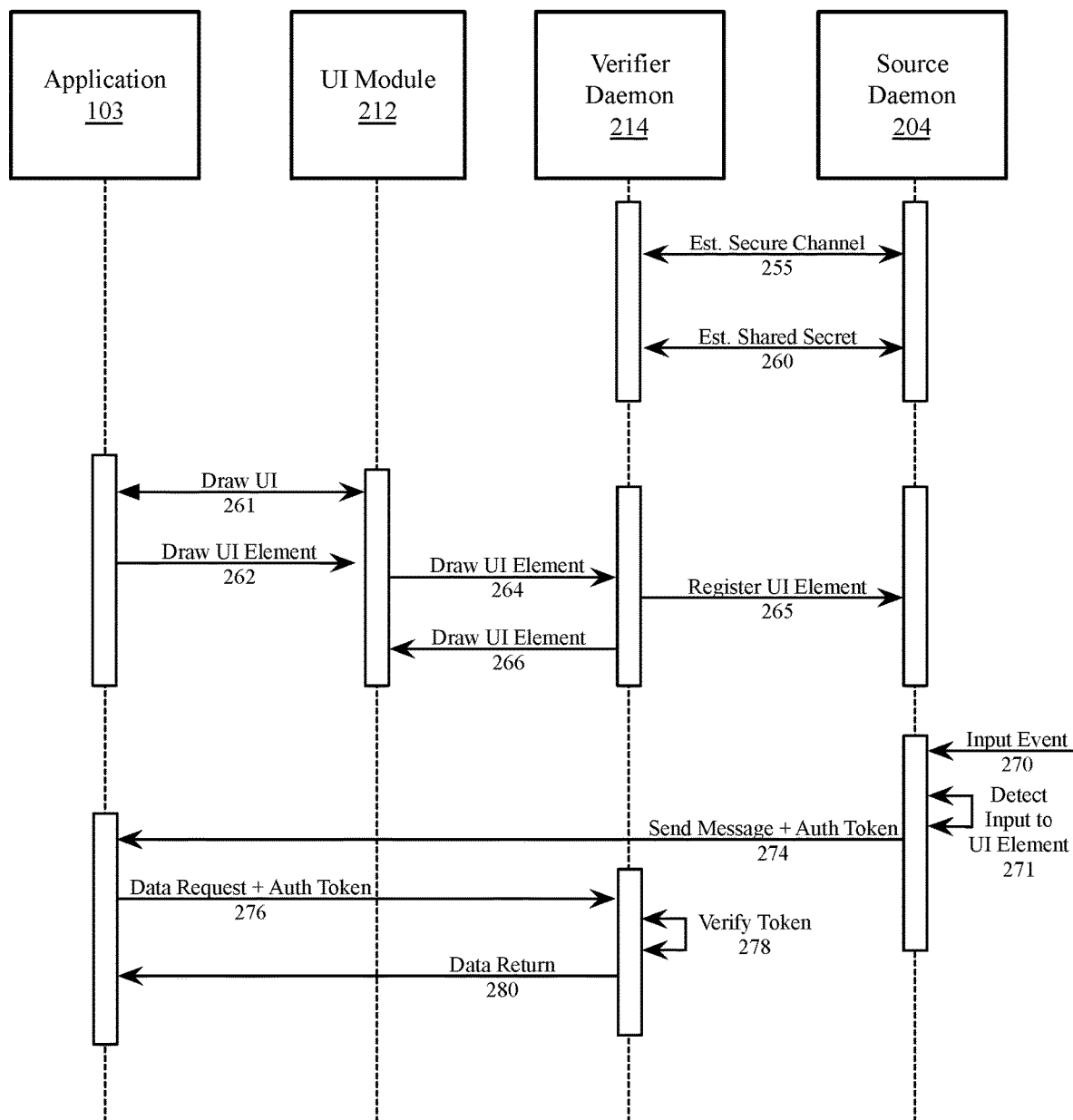

FIG. 2A-2B illustrate system to enable authenticated interface interactions for select functionality on an electronic device. FIG. 2A illustrates a system 200 to enable authenticated interface interactions. FIG. 2B illustrates an API process 250 for authenticated interface interactions.

As shown in FIG. 2A, the system 200 can include an application 103 and a verifier daemon 214. The system 200 also includes a source daemon 204 and an input device 202. The application 103 can communicate with the verifier daemon 214 via the system call API 118 or another mechanism to enable communication between processes of an operating environment on a computing device. The source daemon 204 and verifier daemon 214 can be processes associated with the operating system of an electronic device. The source daemon 204 can be a process configured to report the occurrence of hardware input events from an input device. The source daemon 204 can also report events from sensor devices, including but not limited to an accelerometer. In one embodiment the verifier daemon 214 is a process configured to gate or control access to specific device functionality. In one embodiment the verifier daemon 214 is a component of a window manager or user interface framework of the operating system of the electronic device. In one embodiment, the application 103 can indicate to the verifier daemon 214 to display a verified UI element 220 for which a verified hardware input is enabled. In one embodiment, the application 103 can display the verified UI element 220 and directly perform verification for a hardware input received at the verified UI element 220. In various embodiments, the application 103 or the verifier daemon 214 can perform a registration operation 222 to register the verified UI element 220 with the source daemon 204. The source daemon 204 is a software component of the system that is configured to receive hardware input events that correspond with an input device 202. The input device 202 is a hardware input device, such as a physical keyboard, touch input device, and/or pointer device.

The registration operation 222 registers the verified UI element 220 with the source daemon 204. The registration operation 222 can specify the verified UI element 220 via a variety of mechanisms, which can vary based on the UI, composition, or windowing interface in place on an electronic device. In one embodiment the registration operation 222 specifies an identifier that identifies the verified UI element 220 among various UI elements that are presented for display. In one embodiment, a bounding box for the verified UI element 220 can be provided during the registration operation 222. The bounding box can be a screen-space bounding box or a bounding box for a surface that contains the verified UI element 220. When the source daemon 204 receives a hardware invent from the input device 202 to select the verified UI element 220, an authenticated notification 224 can be transmitted to one or more of the verifier daemon 214 or the application 103. In one embodiment, the verifier daemon 214 receives the authenticated notification 224, performs a verification operation to authenticate the authenticated notification 224, and informs the application 103 or receipt of the authenticated notification 224. In one embodiment, the application 103 receives the authenticated notification 224 and transmits at least a portion of the authenticated notification 224 to the verifier daemon 214 for verification. The verifier daemon 214 can then reply to the application 103 with a verification result. In one embodiment, the application 103 performs the functionality of the verifier daemon 214 or includes logic equivalent to that of the verifier daemon 214. In such embodiment, the application 103 can directly verify the authenticity of the authenticated notification 224.

In one embodiment, instead of a verified UI element 220, the registration operation 222 is performed to register a verified hotkey that may be received via a hardware keyboard that is attached to system 200. The verified hotkey can be a keyboard hotkey to perform a protected operation, such as a paste operation that causes the application 103 to attempt to access a memory buffer that is designated as a pasteboard or clipboard for the system 200. The pasteboard or clipboard is memory buffer that is used to store data that is associated with a copy and paste operation that is performed within or between applications. In some configurations, an authenticated notification 224 of a hardware input event is expected by the system 200 before access to the pasteboard or clipboard memory is provided to the application 103 when accessing data that is inserted into the memory by a different application, as described in further detail below.

The authenticated notification 224 can be verified and/or authenticated by the verifier daemon 214 and/or application 103 using a variety of techniques. In one embodiment, the authenticated notification 224 includes an authentication token. The authentication token can be generated based on a shared secret that is provided or established during the registration operation 222. The verifier daemon 214 and/or application 103 can verify the authentication token to verify the authenticated notification 224. In one embodiment, the source daemon 204 is a trusted component of the system 200. The source daemon 204 may be a software module that is signed by the vendor of the system 200. The signature can be generated based on the source code of the source daemon 204 to enable verification of the provider and integrity of the source daemon 204. The system 200 may verify the signature of the source daemon 204 before loading the source daemon 204 into memory. The verifier daemon 214 and/or application 103 may also verify the signature of the source daemon 204 as part of the authentication and verification process for the authenticated notification 224. The operating system may be configured such that certain system events may only be triggered by trusted components of the system.

An API process 250 for authenticated interface interactions is shown in FIG. 2B. The API process 250 illustrated in FIG. 2B is exemplary of one embodiment, and other embodiments described herein can provided additional or alternate API processes. The API process 250 can be implemented by an application 103, UI module 212, a verifier daemon 214, and a source daemon 204. The application 103, verifier daemon 214, and source daemon 204 are detailed above. The UI module 212 is a component of an operating system that performs or facilitates UI operations on behalf of the application 103. The UI module 212 can include components of a UI client framework and/or window management framework.

The verifier daemon 214 and source daemon 204 can perform a set of operations 255 to establish a secure channel. The secure channel can then be used to perform operations 260 to establish a shared secret. This shared secret can form the basis of the authentication token that is used to validate inputs to a verified UI element. The application 103 can perform a draw operation 261 to draw an application UI. The draw operation 261 can be a included in series of operations that are performed to draw the UI elements of the application. In one embodiment, when the application 103 performs a draw operation 262 to draw a UI element that will be subject to verified input. The UI module 212 can perform an operation 264 to request the verifier daemon 214 to draw a UI element that will be registered as a verified UI element 220 as in FIG. 2A. Alternatively, the application 103 can directly request the verifier daemon 214 to draw the UI element. The verifier daemon 214 can perform an operation 265 to send register the UI element as a verified UI element with the source daemon 204. The UI registration operation 265 is used to identify the region in which the verified UI element will be drawn. In one embodiment, the UI registration operation 265 can also be used to establish a shared secret or exchange cryptographic material between the verifier daemon 214 and the source daemon 204. In the illustrated embodiment, the region in which the UI element will be drawn is specified by the application 103 during draw operation 262. The verifier daemon 214 can then draw the UI element at the requested location, either directly or using a request 266 to the UI module 212. Alternatively, where the UI element is associated with a prompt presented by an operating system, an operating system component can stand in place of the application 103.

Subsequent to the preparation of the secure UI element, the source daemon 204 can detect an input from an input device (e.g., touch screen, touchpad, mouse) during operation 270. The source daemon 204 can perform an operation 271 to detect whether the input corresponds with an input to the registered UI element. Operation 271 can include comparing the details associated with the input event with details (e.g., UI identifier or coordinates) specified for the UI element during the registration performed in operation 265. If the detected input corresponds with an input to the registered UI element, source daemon 204 can perform an operation 274 to send a message and authorization token to the application 103. The application 103 can then perform an operation 276 to send a data request and the authorization token to the verifier daemon 214. The verifier daemon 214 can perform an operation 278 to verify the authorization token. If the authorization token is legitimate, the verifier daemon 214 can perform an operation 280 to return data to the application 103 that is authorized to be returned via the input to the registered UI element.

Similar operations can be performed with a hotkey input via a physical keyboard. When a physical keyboard is in use, the source daemon 204 may generate an authentication token in response to detection of a registered hotkey entered at the keyboard. This authentication token can be used by an application to enable authenticated access to the pasteboard. When a physical keyboard is in use, it may not be necessary for the verifier daemon 214 to be responsible for drawing the UI element.

Figure 3:
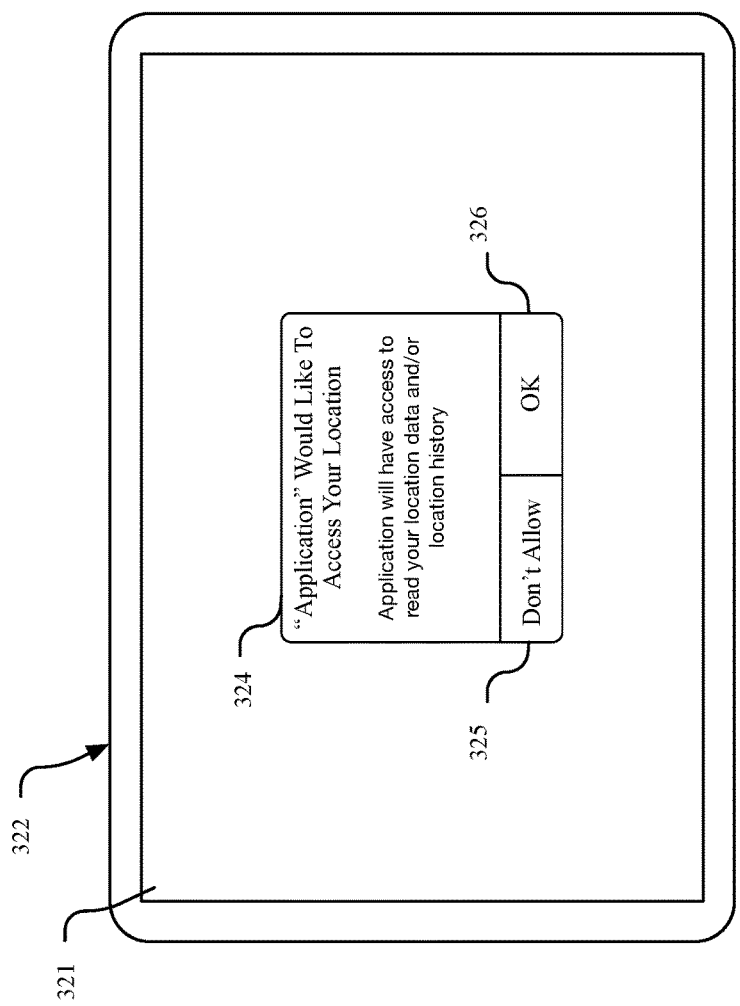
FIG. 3 illustrates a system including an electronic device in which an access control prompt is displayed to enable access to functionality provided by the electronic device.

FIG. 3 illustrates a system 300 including an electronic device 322 in which an access control prompt 324 is displayed to enable access to functionality provided by the electronic device 322. The electronic device 322 can be a mobile computing device, such as a laptop computing device or tablet computing device. The electronic device 322 can also be a desktop computer device. Techniques illustrated by system 300 can also be applied to smartphone devices.

System 300 is illustrated as displaying a prompt to enable an application to access a location services function of the electronic device 322. Similar prompts can also be displayed when an application requests access to privacy sensitive data or hardware on the electronic device 322. For example, when an application first attempts to access hardware resources of the electronic device 322, such as a camera or microphone, a prompt similar to the access control prompt 324 can be presented on a display 321 of the electronic device 322. A similar prompt can also be presented when the application attempts to access privacy sensitive data such as user contacts, photos, or pasteboard memory. The access control prompt 324 can include a first interface element 325 that enables the user to block ("don't allow") access to the functionality. A second interface element 326 may be presented to allow ("OK") the application to access the functionality. In one embodiment, once the application is granted access to the prompted function, the application may continue to access the function for a limited period of time or unless the access is revoked within permission settings of the electronic device 322.

The access control prompt 324 can be configured as a verified access control prompt by registering the second interface element 326 as a verified UI element 220 as in FIG. 2A. Registration and input handling for the second interface element 326 of access control prompt 324 can be performed according to API process 250 as in FIG. 2B. For location services functionality, a component of an operating system of the electronic device 322 that acts as a verifier daemon 214 can register the second interface element 326 with a source daemon 204. The source daemon 204 can be a component of the operating system that is tasked with handling hardware input events and triggering software events in response to the hardware input events. In one embodiment, the registration may include the exchange of cryptographic material that is used by the source daemon 204 to generate an authentication token. This authentication token can be transmitted along with the software event that notifies the verifier daemon 214 that input has been received at the registered UI element (e.g., second interface element 326). The authentication token is used by the verifier daemon 214 to ensure that the software event has not been spoofed by malicious logic that is executed on the electronic device 322. If an authentication token is not sent with the software event or an invalid token is transmitted, access to the function associated with the verified access prompt will not be provided or enabled.

Figure 4:
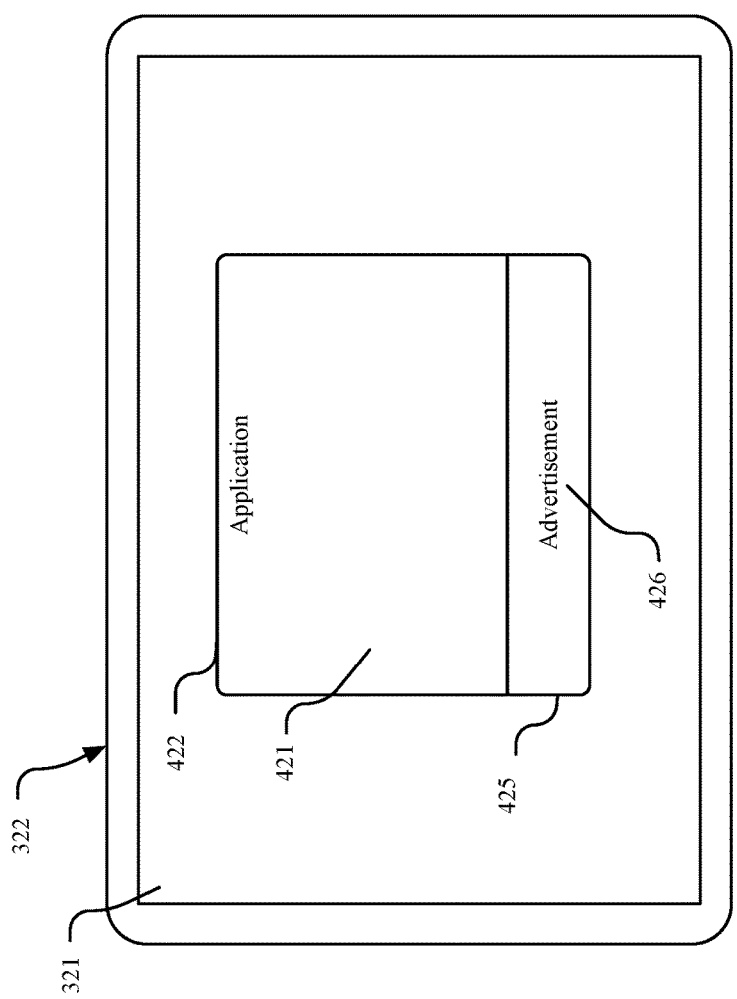
FIG. 4 illustrates a system in which electronic device verifies an input to select an advertisement displayed within an applicated executed by the electronic device.

FIG. 4 illustrates system 300, in which an electronic device 322 verifies an input to select an advertisement displayed within an applicated executed by the electronic device 322. The electronic device 322 can execute an application 422 having a user interface 421 that is displayed on the display 321 of the electronic device 322. The application 422 can be an at least partially advertisement supported application that may periodically display an UI element 425 on the user interface 421 that includes an advertisement 426. In response to receipt of an input (e.g., touch, click) to select the UI element 425 that displays the advertisement 426, the operating system of the electronic device 322 can launch or move to the foreground a browser application and load a Uniform Resource Locator (URL) associated with the advertisement 426. In one embodiment, logic associated with an App Store framework of the operating system can be called in response to selection of the advertisement 426 and provide the URL associated with the advertisement. The provided URL can be a link to an application store page of the App Store, or a website on a network (e.g., Internet), where a user may purchase and/or download a software program that is advertised by the advertisement 426. In addition to providing the URL, the App Store framework can provide attribution data along with the URL that identifies the application 422 that displayed the advertisement 426 that was selected by the user. The attribution data can be provided along with the URL that is opened in response to selection of the advertisement 426. The attribution data may also or alternatively be recorded internally by the App Store framework. The attribution data can be aggregated across an advertisement campaign. The aggregated metrics can then be incorporated into advertisement metrics for the advertisement campaign. The advertisement metrics for the advertisement campaign may be provided to the client of the advertisement service that has contracted to run the advertisement 426.

In one embodiment, to prevent the creating of false attribution data by malicious software on an electronic device, generation and transmission of attribution data for a selected advertisement is gated behind a verified UI element 220 as in FIG. 2A. Registration and input handling for the UI element 425 that displays the advertisement 426 can be performed according to API process 250 as in FIG. 2B. For example, the application 422 can register the UI element 425 that presents the advertisement 426 as a verified UI element. A component of an operating system of the electronic device 322 may also register the UI element on behalf of the application 422. Once registered as a verified UI element, software events that indicate that the advertisement has been selected on a user interface will not result in the transmission of attribution data unless that software event corresponds with a hardware input event received at the electronic device. When the software event that reports the occurrence of the input is determined to correspond with a hardware input event, attribution data can be transmitted with the provided URL and/or recorded by the App Store framework.

Figure 5:
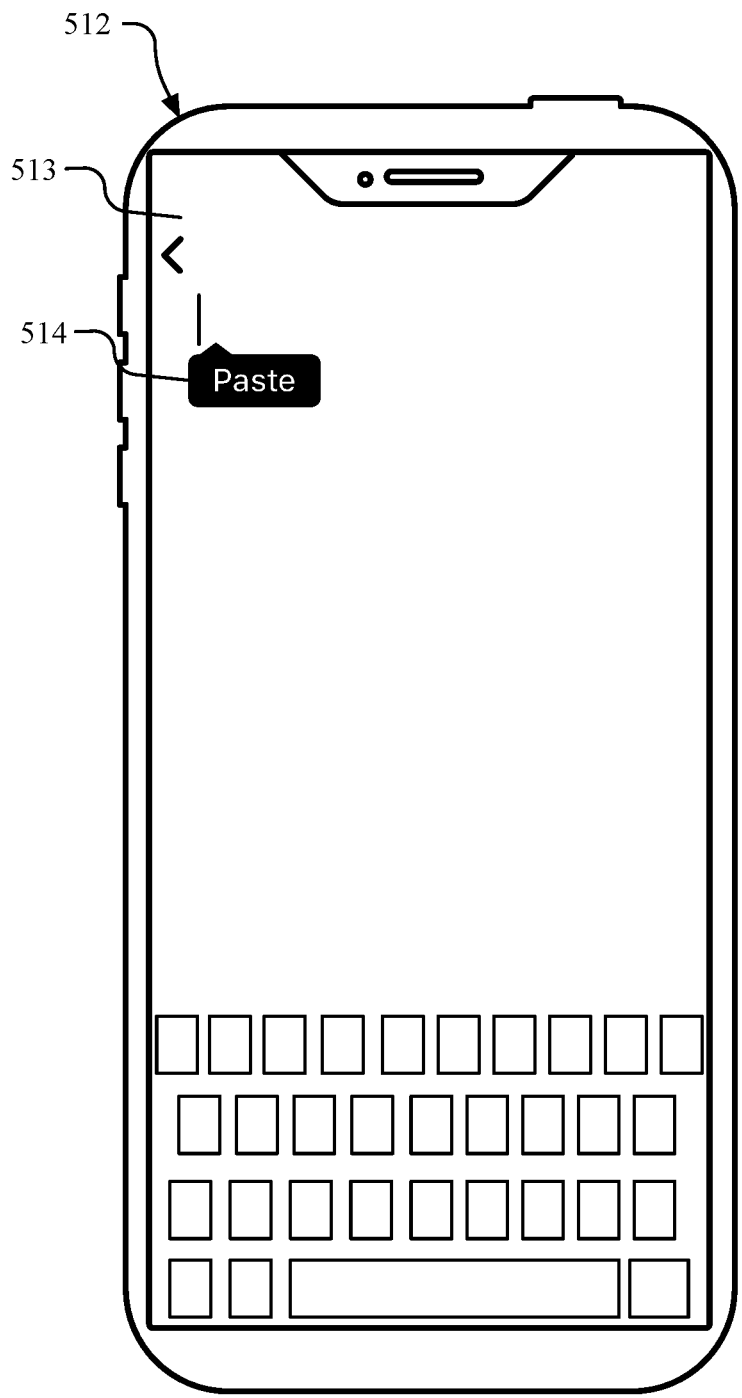
FIG. 5 illustrates a system in which an electronic device verifies an input to paste data from pasteboard memory of the electronic device.

FIG. 5 illustrates a system 500 in which an electronic device 512 verifies an input to paste data from pasteboard memory of the electronic device 512. The electronic device 512 can be a handheld electronic device, such as a smartphone. Techniques described for the electronic device 512 are also applicable to other types of electronic devices described herein, such as table computing devices, laptop computing devices, or desktop computing devices. The electronic device 512 can present a user interface 513 of an application. The user interface 513 can enable a user to enter an input gesture that causes the display of an interface element 514 that can be used to paste data that is stored in a pasteboard. The data can be inserted into the pasteboard via a copy action. The copy action can be performed by the application having the user interface 513, or from a different application on the electronic device 512. The data may also have been inserted into the pasteboard by an application on a different device that has a shared pasteboard with the electronic device 512. For example, multiple devices that share a common cloud services account can have a shared pasteboard. The shared pasteboard can copy and paste operations to be performed between the multiple devices.

To prevent malicious access to pasteboard memory by an application that executes on the electronic device 512, interface element 514 can be configured as a verified UI element 220 as in FIG. 2A. The registration and input handling for interface element 514 can be performed according to API process 250 of FIG. 2B, in a similar manner as the second interface element 326 of FIG. 3 and the UI element 425 of FIG. 4. The application that displays the user interface 513 can register interface element 514 or interface element 514 can be registered on behalf of the application by a component of the operating system of the electronic device 512. For example, a pasteboard manager or UI component can register the interface element 514 with an input handling component of the operating system of the electronic device 512 and verify that a software event that provides notice of selection of interface element 514 corresponds with a hardware input event that is received via an input device of the electronic device 512.

Figure 6:
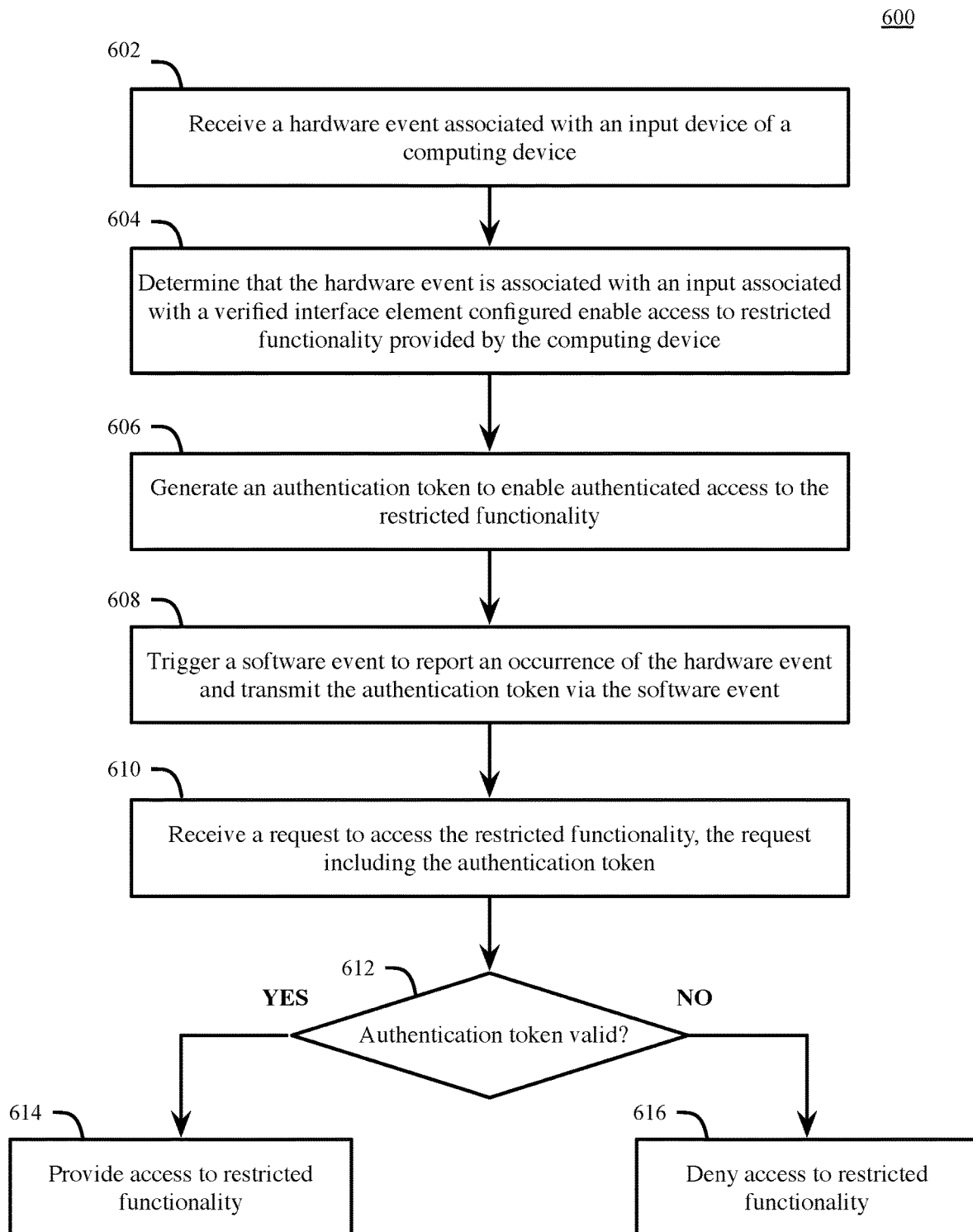
FIG. 6 illustrates a method of performing authenticated interface element interactions with a verified UI element.

FIG. 6 illustrates a method 600 of performing authenticated interface element interactions with a verified UI element 220. According to method 600, logic on an electronic device can perform an operation to receive a hardware event associated with an input device (602). The hardware event can be received by from an input device by a component of an operating system of the electronic device that is configured to operate as a source daemon 204 as in FIG. 2A. Logic of the electronic device can process the hardware event to determine if the hardware event is indication of an interaction with the user interface element that is registered as a verified UI element.

The logic can determine that the hardware event is associated with an input to a verified interface element that is configured to enable access to restricted functionality provided by the electronic device (604). The restricted functionality can be a function provided by a process executing on one or more processors of the electronic device. The secure interface element can be a verified UI element that corresponds with the function provided by the process. The determination can be performed by comparing data associated with the hardware input with registration data for the verified UI element. The registration data can specify an identifier that identifies the verified UI element 220 among the various UI elements that are presented for display by the electronic device. The registration data may additionally or alternatively specify window or screen coordinates associated with the verified UI element. Selection of the verified UI element can be determined when a hardware input event is determined to be within the specified coordinates of the verified UI element or determined to correspond with the UI identifier of the verified UI element.

The logic can then generate an authentication token to enable authenticated access to the restricted functionality (606). The authentication token can be generated based on a shared secret or other cryptographic material that is generated or exchanged during registration of the verified UI element. In one embodiment, the shared secret or other cryptographic material is exchanged over an encrypted communication channel that is established between a verifier daemon and source daemon of an operating system of the electronic device. In one embodiment, an application can act as a verifier and can also be involved in the creation or management of the shared secret or other cryptographic material. The authentication token can be generated before receipt of a hardware event or created once a determination has been made that the hardware event corresponds with a verified UI element. In one embodiment a timestamp can be provided as an input to the authentication token generation process and sent along with the authentication token. The timestamp can be, for example, a timestamp associated with the hardware event received from the input device. The timestamp can be used by the verifier during verification of the input.

The logic can then trigger a software event to report an occurrence of the hardware event and transmit the authentication token via the software event (608). The software event can be an event provided by an event system of the operating system to inform software of input events that correspond with UI elements displayed by the user interface. In one embodiment, the authentication token is the mechanism that is used to verify the authenticity of the software event. A fraudulent software event that is generated by software that executes on the electronic device will not correspond with a hardware event. Such fraudulent software event will either not contain an authentication token or contain a verifiably incorrect software token. Where other verification mechanism are in use, fraudulent software events will also lack the specified verification mechanism (e.g., signature, etc.) or include an incorrect verification mechanism. The software event can propagate though the event system and be received by an application or other software component that is to act upon the software event. The application or other component can then send a request to access the restricted functionality.

The logic can then receive the request to access the restricted functionality, with the request including the authentication token (610). If the authentication token is valid ("yes" 612), then the logic can provide the data stored in the memory buffer (614). If the authentication token is invalid ("no", 612), then the logic can deny access to data stored in the memory buffer (616). Determining the validity of the authentication token can be performed by generating a new authentication token using the shared secret or other cryptographic material and comparing the new authentication token with the received token. Generation of the new authentication token can be performed using a timestamp that is received along with the authentication token in the request to access the restricted functionality.

Figure 7:
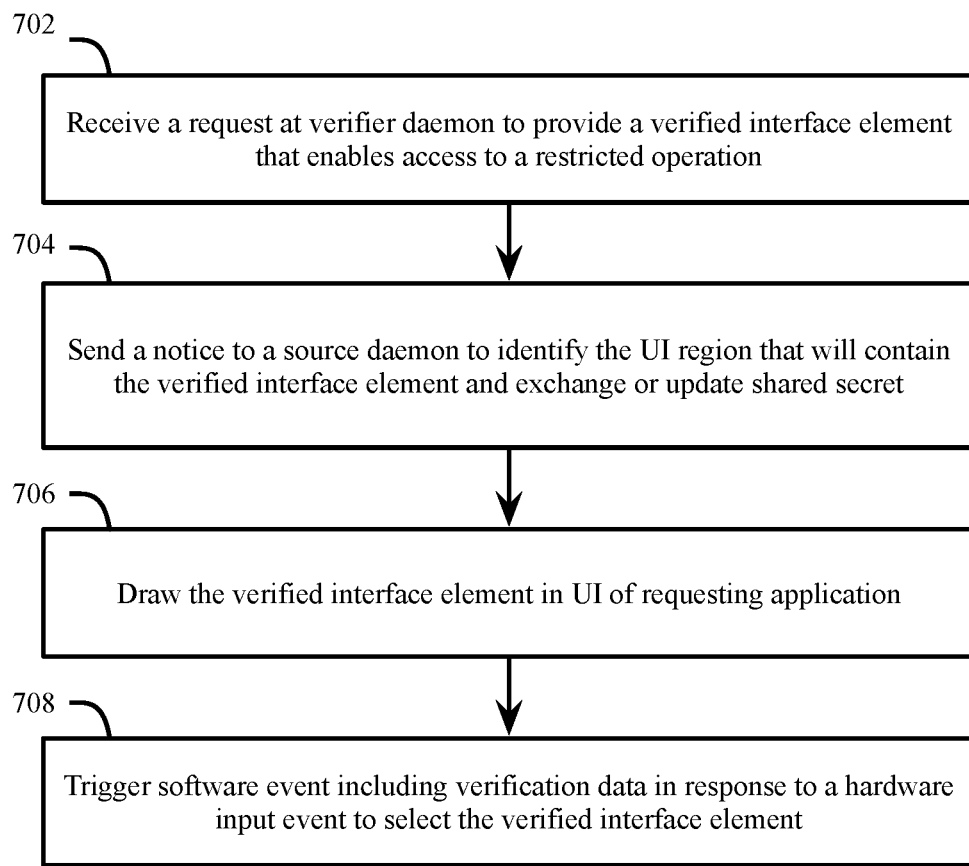
FIG. 7 illustrates a method of drawing a verified interface element.

FIG. 7 illustrates a method 700 of drawing a verified interface element. Method 700 can be performed by software and hardware logic of an electronic device as described herein. According to method 700, logic on the electronic device can receive a request at a verifier daemon to provide a verified interface element that enables access to a restricted operation (702). The logic can then send a notice to a source daemon to identify the UI region that will contain the verified interface element (704). The notice can specify the verified interface element via a variety of techniques, including via a UI identifier or via UI, window, or screen space coordinates. The logic can then draw the verified interface element in UI of requesting application (706). Logic of the electronic device can then be configured to trigger a software event including verification data in response to a hardware input event to select the verified interface element (708). The verification data can be an authentication token, an authentication token and a timestamp, a signature included with the software event, a signature associated with the generator of the software event, or another verification mechanism.

Figure 8A:
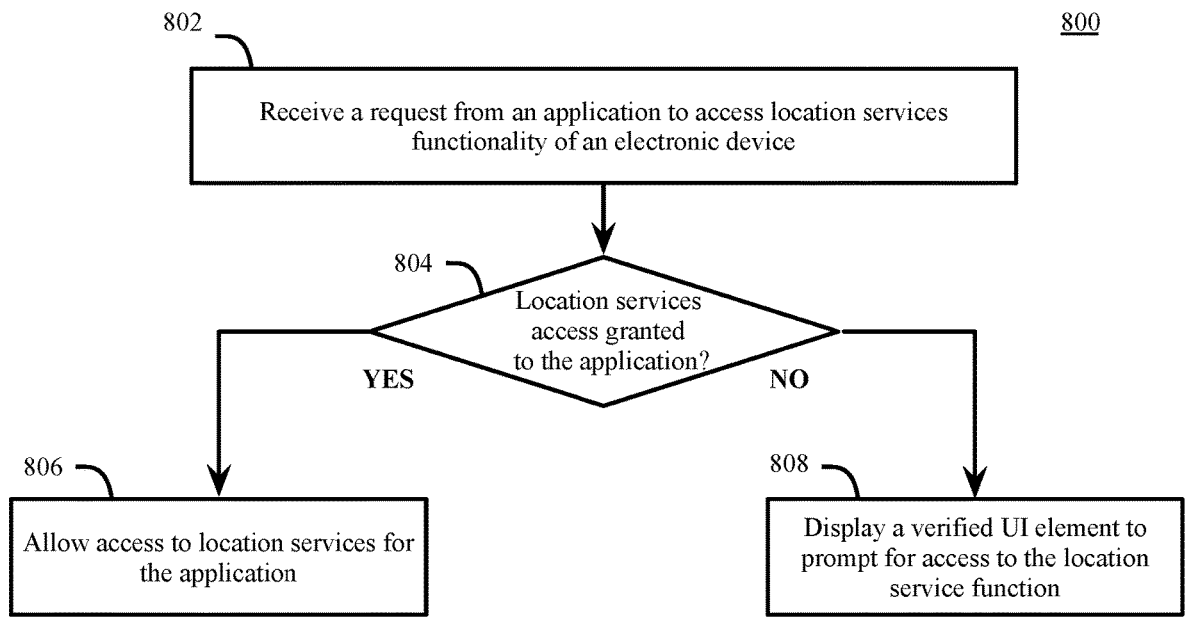
FIG. 8A-8C illustrate methods of managing access to functions provided by a process of an electronic device using verified UI elements.
Figure 8B:
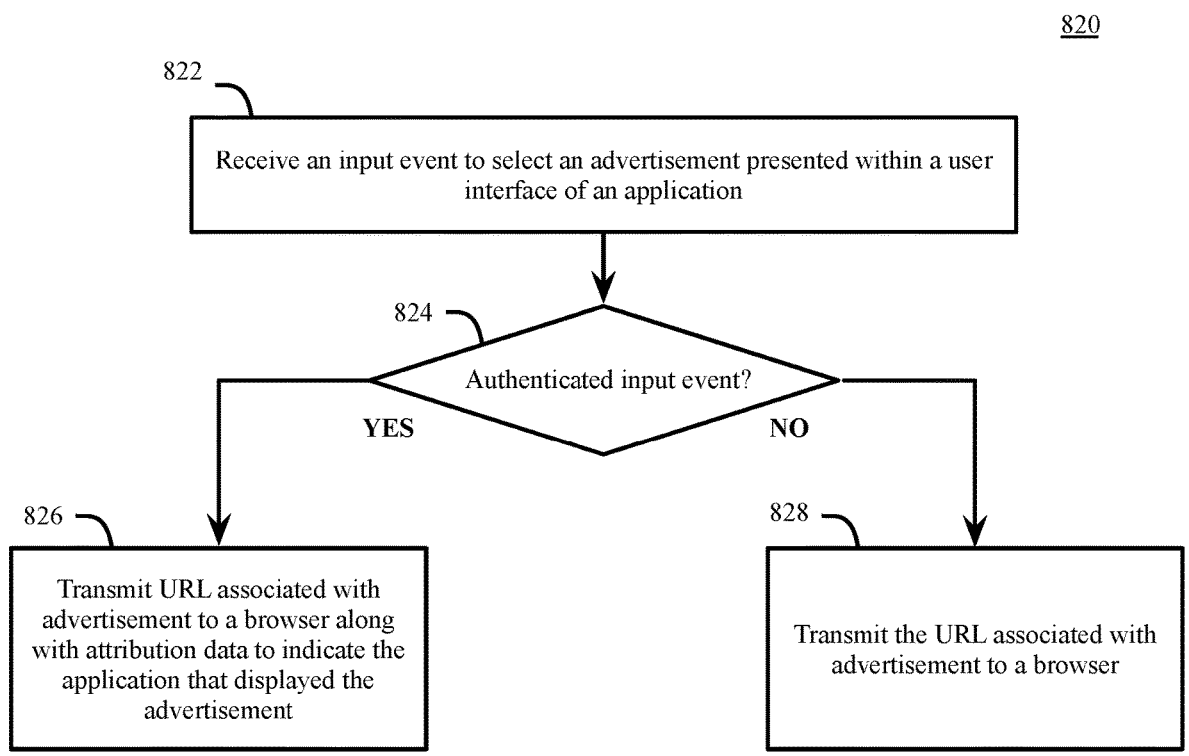
Figure 8C:
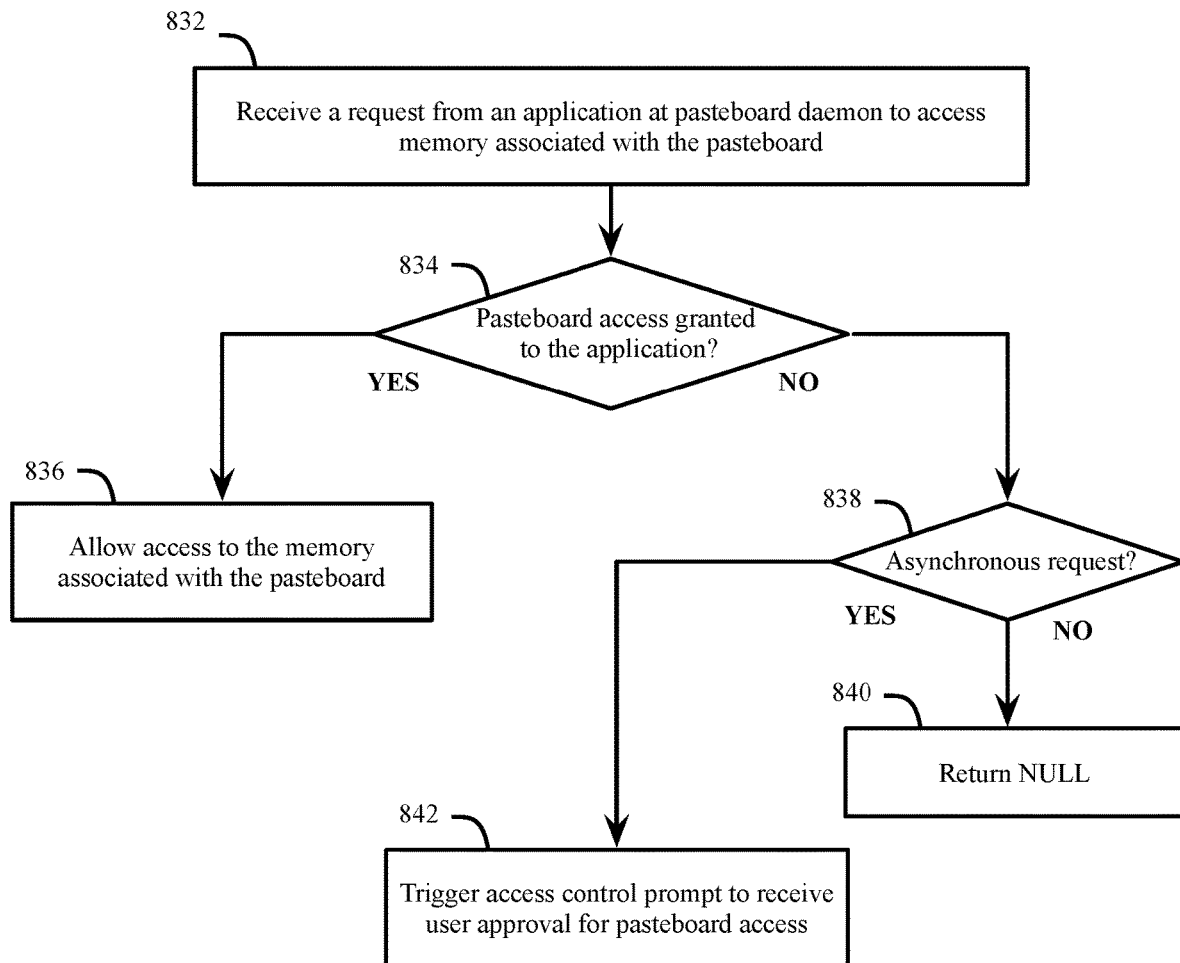

FIG. 8A-8C illustrate methods 800, 820, 830 of managing access to functions provided by a process of an electronic device using verified UI elements. FIG. 8A illustrates a method 800 to enable access prompt gating for a location service function. FIG. 8B illustrates a method 820 to enable access prompt gating for an advertisement attribution function. FIG. 8C illustrates a method 830 to enable access prompt gating for a pasteboard function. Methods 800, 820, 830 can be performed by any of the electronic devices described herein using the techniques described above for the respective restricted functionalities.

Method 800 of FIG. 8A includes for logic of an electronic device to receive a request from an application to access location services functionality of an electronic device (802). The logic can determine whether location services access is granted to the application (804). If location services access is granted to the application ("yes" 804), for example, based on a previous access prompt presented for the application, the logic can allow access to location services for the application (806). If location services access has not been granted to the application ("no" 804), the logic can then display a verified UI element to prompt for access to the location service function (808). Access to the location service function can then be provided in response to selection of the verified UI element that enables access to the function. Enabling access to the location service function enables the application to gain access to location data of the electronic device, including a determined currently location of the electronic device or location history data for the electronic device.

Method 820 of FIG. 8B includes for logic of an electronic device to receive an input event to select an advertisement presented within a user interface of an application (822). The logic can determine the input event is an authenticated input event (824), such that the input event is verified as being associated with an actual hardware input event using techniques described herein. If the input corresponds with an authenticated input event ("yes" 824), the logic can transmit the URL associated with advertisement to a browser, along with attribution data to indicate the application that displayed the advertisement (826). If the input does not correspond with an authenticated input event ("no" 824), then the logic will only transmit the URL associated with the advertisement to the browser (828).

Method 830 of FIG. 8C includes for logic associated with the electronic device to receive a request from an application at a pasteboard daemon to access memory associated with the pasteboard (832). In this instance, the pasteboard daemon can act as a verifier (e.g., verifier daemon 214 as in FIG. 2A) for input to a verified UI element that is used to gate access to pasteboard memory. Alternatively, other UI system or window manager daemons can act as the verifier for input to the verified UI element. The logic can determine whether pasteboard access is granted to the application by the access control system of the computing device (834). If access has been previously granted ("yes", 834), then the logic can allow access to the memory associated with the pasteboard (836). If access has not yet been previously granted ("no", 834), then the logic can determine whether the request is a synchronous request or an asynchronous request (838). For a synchronous request, the application can request pasteboard data from the pasteboard daemon and wait for the request to return the pasteboard data. For an asynchronous request, the application can send a request to the pasteboard and proceed with other operations. The pasteboard daemon can then asynchronously respond to the request with the pasteboard data. In the event the request is a synchronous request (i.e., not an asynchronous request), then the pasteboard logic can return a NULL value (840), or otherwise not return the information that is in the pasteboard memory. If the request is an asynchronous request, the pasteboard daemon can request display of, or otherwise trigger the access control prompt to receive user approval for pasteboard access by the application (842).

Figure 9:
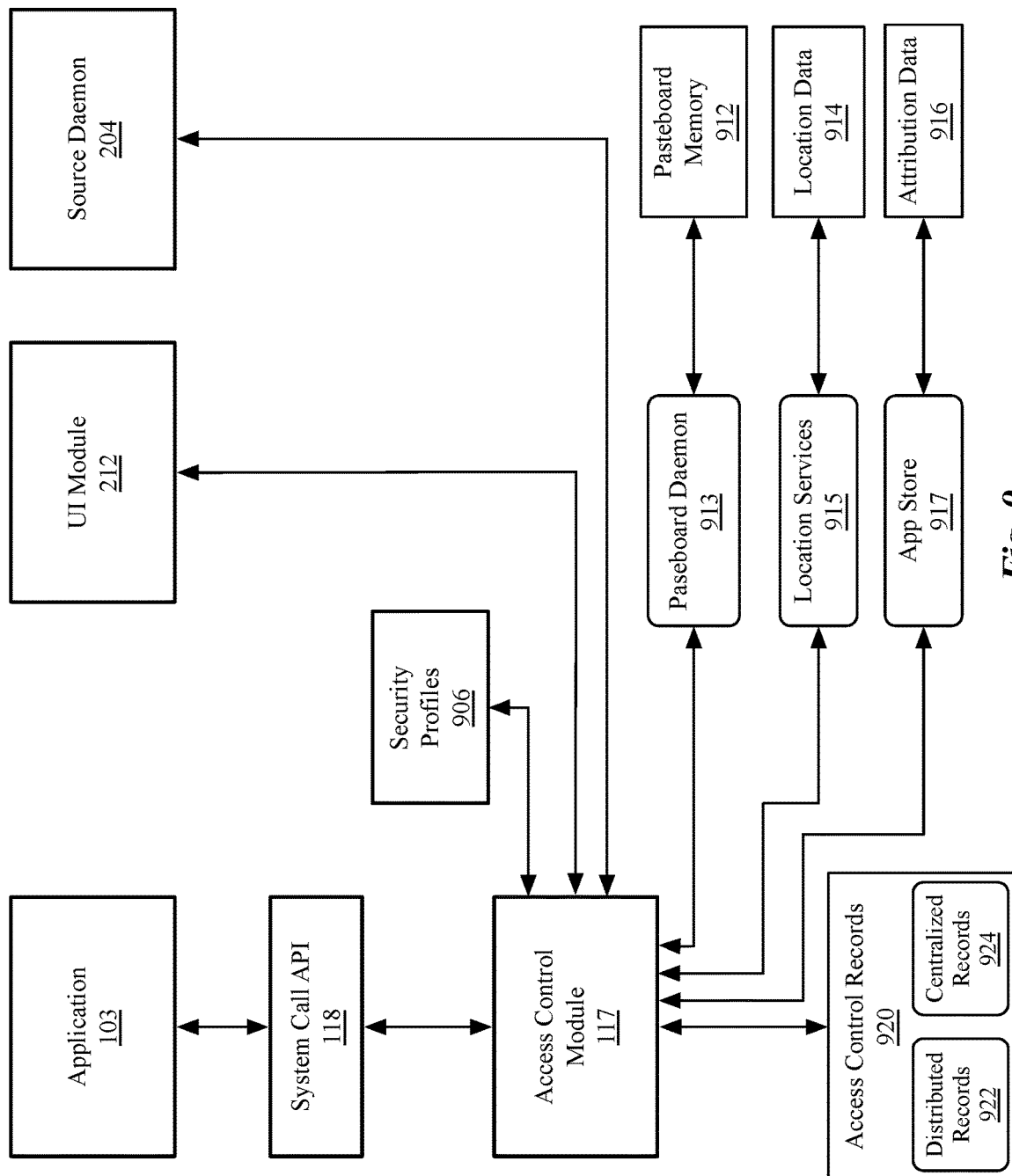
FIG. 9 illustrates a system for gating access to device functionality behind verified UI elements and facilitating the provision of a notification to a user when such functionality is accessed.

FIG. 9 illustrates a system 900 for gating access to device functionality behind verified UI elements and facilitating the provision of a notification to a user when such functionality is accessed. The system 900 includes software and hardware components of a computing device. The computing device associated with the system can be, but is not limited to a desktop, laptop, tablet computer, mobile phone (e.g., smartphone), wearable device, personal digital assistant (PDAs), media player, gaming device, television or television set-top box, smart appliance, and/or smart speaker device. Software components of the system 900 can be instructions that are executed by one or more processors (e.g., application processors, system processors, sensor processors, always-on processors, etc.) or firmware that is executed by one or more microcontrollers.

In one embodiment, software on the system 900 includes application 103, which is communicatively coupled via the system call API 118 to the access control module 117. The application 103 can communicate via the system call API 118 to the access control module 117 to gain access to resources such as privacy sensitive user data or system resources. Default access for certain resources can be provided to the application 103 via security profiles 906. A security profile for an application can be dynamically generated or updated by compiling a set of one or more rules that specify resources to which an application can access.

Upon a first access by the application 103 to a privacy sensitive resource, the access control module 117 can trigger the UI module 212 to display a dialog prompt including a verified UI element, such as access control prompt 324 of FIG. 3, that enables a user to explicitly grant or deny access to a resource. A record of access status can be recorded for the resource based on the response provided to the access control prompt. The response is correlated with receipt of a hardware input event by the source daemon 204, which detects hardware input events and responds by transmitting software events to the software components of the system 900.

In some embodiments, the system 900 can maintain access control records 920 that record access decisions on a per-user basis, with each user on the system having a separate record instance. In one embodiment the access control records 920 identify a resource for which the user has permitted or denied access, as well as the specific application or process that triggered the access request. In one embodiment, the access control records 920 can store an unknown status for some resources, which can indicate that no prompt results or rights delegation has been recorded for the resource. In one embodiment the access control records 920 include distributed records 922 and centralized records 924. Distributed records 922 are used to persist access that was previously granted or denied to data files or folders. In one embodiment, distributed records 922 can be stored in extended file system data for files or folders containing user data. For distributed records 922, if a file or folder for which a record exists is deleted, in one embodiment the portion of the distributed records 922 associated with that file or folder can also be deleted. Centralized records 924 can be stored in a central database for each user and can be used specifically to record the results of an access request for a system resource. In various embodiments, access records for pasteboard memory 912 and location data 914 may be stored in either the distributed records 922 or the centralized records 924. In one embodiment, attribution data 916 is stored ephemerally during relay of the attribution data 916 to a browser application. In such embodiment, access control to the attribution data 916 is not maintained. In one embodiment, the app store 917 framework can maintain records of attribution data 916 generated for selected advertisements. In such embodiment, access to that data is maintained via access control records 920. Default access to attribution data 916 can be managed security profiles 906.

The system 900 is configurable such that if the application 103 attempts to access location data 914 in a manner that is disconnected with an expression of intent by the user to access the location data 914, access will be denied to the application 103. In various embodiments, location data 914 includes any data accessible via the location services 915 module. The location data 914 can include a current location of the electronic device that includes the system 900 and/or location history of the electronic device. Access to location data 914 can be provided to the application 103 once a user allows access via a verified UI element, with the location services 915 module or the UI module 212 acting as the verifier daemon. Access to the location data 914 can be gated on a per-access basis or longer-term access to location services 915 can be stored for the application 103 in the access control records 920. Conditional access can also be provided to the location data 914, such that the application 103 can access the location data 914 while active and/or in the foreground, with access while in the background disabled.

The system 900 is configurable such that if the user of the application 103 selects an advertisement displayed by the application 103, attribution data that links the displayed advertisement and the application 103 is not transmitted unless selection of the advertisement corresponds with an expression of intent by the user to select the application. This expression of user intent is recorded in the form of a hardware input to the verified UI element that displays the advertisement (e.g., UI element 425). The hardware input to select the advertisement is detected by the source daemon 204. The hardware input can be verified via an authentication token that is transmitted by the source daemon 204 along with a notification of the input, or via another verification method described herein (e.g., trusted components, signatures). The occurrence of the hardware input is verified by a verifier daemon. In various embodiments, the app store 917 or UI module 212 can include the verifier daemon that verifies that an input received to the verified UI element corresponds with a hardware input detected by the source daemon 204.

The access control module 117 is configured to communicate with a pasteboard daemon 913 to manage access control for pasteboard memory 912. The access control module 117 can also communicate with a location services 915 module or framework to manage access to location data 914. In one embodiment the access control module 117 can communicate with an app store 917 framework to determine whether to generate, store, or send attribution data for an advertisement selected by a user. Alternatively, the app store 917 framework can directly manage whether to transmit attribution data without interacting with the access control module 117. In one embodiment, the access control module 117 can maintain a record of whether a user has opted-out of transmission of attribution data for a selected advertisements. In such embodiment, the app store 917 framework will not transmit attribution data 916 for selected advertisements. The system call API 118 can provide interfaces to access the pasteboard memory 912, location data 914, and attribution data 916 using one or more variants of the API process 250 of FIG. 2B.

In one embodiment, the pasteboard daemon 913 can receive requests submitted via the system call API 118 to copy data into (copy) and copy data out of (paste) the pasteboard memory 912. Access to the pasteboard daemon 913 may be gated via the access control module 117. In one embodiment, the pasteboard daemon 913 may instead perform its own access control operations. An authenticated pasteboard API based on the API process 250 of FIG. 2B is provided to secure inter-application pasteboard operations. In such embodiment, the pasteboard daemon 913 and/or UI module 212 is used draw a paste button on the UI on behalf of an application 103. As the application 103 does not directly draw the paste button, it is more difficult for a maliciously coded application to display a spoofed paste button. The pasteboard daemon 913 will also have knowledge of where in the UI the paste button is being displayed and can use that information to validate requests to access data in the pasteboard. When the pasteboard daemon 913 draws the paste button, the pasteboard daemon can inform the source daemon 204 that the paste button is a verified UI element that is associated with a verified hardware input. The verified UI element can be identified based on a UI identifier associated with the region. In some implementations, the pasteboard daemon 913 can identify verified UI element to the source daemon 204 using the screen coordinates in which the paste button is drawn. Various other techniques can be used based on the implementation details of the UI system.

When the source daemon 204 detects a hardware input that corresponds with the paste button, the source daemon 204 can send a notification of the hardware input to the application 103, along with an authentication token. The application 103 can receive the authentication token and send an authenticated paste request to an operating system component that acts as a verifier daemon (e.g., verifier daemon 214 as in FIG. 2A-2B). In one embodiment, the verifier daemon is the pasteboard daemon 913. In one embodiment, the UI module 212 includes the verifier daemon. The authentication token can include cryptographic material that is generated based on a shared secret that is pre-exchanged between or pre-generated by the verifier daemon (e.g., pasteboard daemon 913 or UI module 212) and the source daemon 204. In one embodiment, the verifier daemon and source daemon 204 are privileged processes that are able to communicate over a secure channel that is provided by the operating system. This secure channel can be used to exchange shared secrets or other cryptographic material. The shared secret can be used by the source daemon 204 to generate an authentication token in response to detection of a touch input to a UI region that has been identified as the location or UI identifier of the paste button.

A timestamp can be provided as an input to the authentication token generation process and sent along with the authentication token. Should the application 103 attempt to alter the timestamp associated with a touch input when attempting to access pasteboard memory 912, the altered timestamp will cause the token authentication process at the pasteboard to fail when the altered timestamp is used to verify the authentication token.

Using the above techniques, if the application 103 attempts to access the pasteboard in a manner that is disconnected with an expression of intent by the user to access the pasteboard, access will be denied to the application 103. However, exemptions to authenticated access to the pasteboard may be enabled in some scenarios. When an exemption is in place, an application will be allowed to access the pasteboard without requiring authentication. Exemption-based access is enabled for scenarios in which the likelihood of malicious or surreptitious access to the pasteboard is low. Exemptions may be enabled based on the application that places data into the pasteboard or the timing of the copy and paste operation. For example, when an application places data into the pasteboard, an identifier of the application, an identifier for the team (e.g., developer or vendor) associated with the application, and a timestamp in which the data is stored, can be preserved as pasteboard metadata. When an application attempts to access data in the pasteboard, the application identifier, team identifier, and the access attempt timestamp can be compared with corresponding elements of the pasteboard metadata. Exemptions can be configured such that an application may be allowed to access data that the application placed in the pasteboard, such that a single application can perform a copy and paste operation without authentication. An exemption can also be configured to allow an application to access data placed by an application having the same team identifier. An exemption can also be configured to allow any application to access the pasteboard for a limited amount of time after the data is stored to the pasteboard. Additionally, as indicated above, once a non-exempt access to the pasteboard is authenticated, the same application can continue to access the pasteboard until new data is stored to the pasteboard.

Additionally, variants of the authenticated paste techniques may be employed under some circumstances. In one embodiment, it may not be required for the pasteboard daemon to draw the paste icon. In such scenario, the application may register the UI identifier of the paste icon with the input daemon. The source daemon 204 can then enable the generation of authentication tokens when a touch input is detected at a location associated with the registered UI identifier. An additional variant is keystroke-based pasteboard authentication, which may be enabled in addition to or instead of touch-based pasteboard authentication. When a physical keyboard is in use, the input daemon may generate pasteboard authentication tokens in response to detection of a paste hotkey entered at the keyboard. This authentication token can be used by an application to enable authenticated access to the pasteboard.

Transparency Notifications for Select Functionality

Instead of or in addition to requiring verified hardware inputs before access is granted to select functionality, notifications can be displays via a UI when access is granted by the system to select functionality. For example, in some embodiments explicit authorization prompts to enable access to pasteboard memory 912 can be replaced or supplemented with a system that notifies the user when a cross-application paste occurs. The pasteboard daemon 913 may receive requests directly via the system call API 118. The pasteboard daemon 913 can send a request to the UI module 212 to trigger the display of pasteboard transparency notification when facilitating an inter-application paste operation. The pasteboard transparency notification can indicate the application that is pasting from the pasteboard and the source application of the pasted data. For cross-system pasting using a shared pasteboard, the source device of the pasted data may be displayed. The pasteboard daemon 913 can also perform additional privacy and security measures, such as causing data that is stored in the pasteboard to expire after a period of time.

Figure 10:
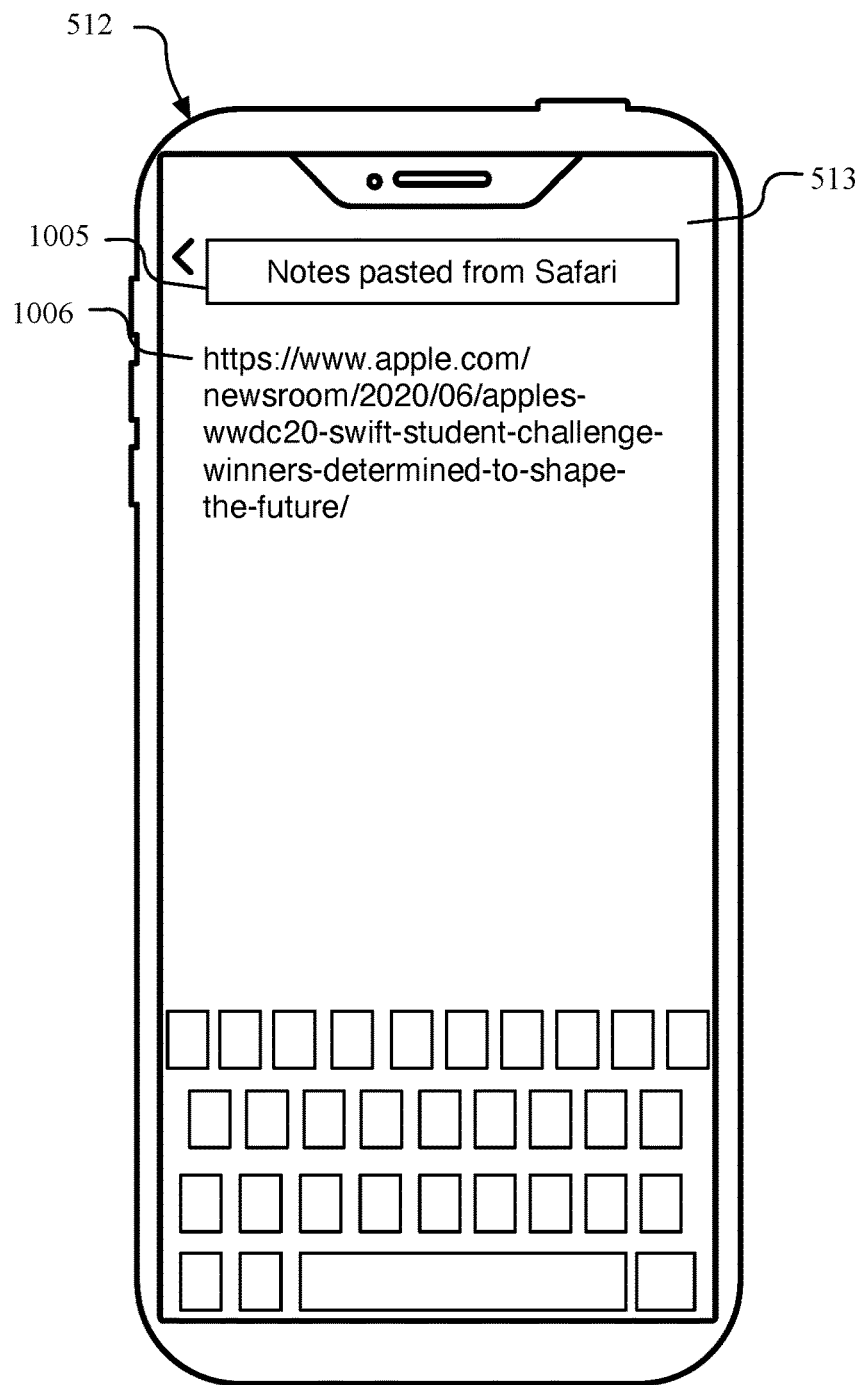
FIG. 10 illustrates a system to display a transparency notification associated with a paste operation performed between applications.

FIG. 10 illustrates a system 1000 to display a transparency notification associated with a paste operation performed between applications. When the user pastes the data from the pasteboard, the data contained in the pasteboard is inserted into the application and displayed via the user interface 513 of the application. For example, a user of the electronic device 512 can perform a paste operation illustrated in FIG. 5 to paste a URL into a user interface 513 of a note taking application. The pasted data is inserted into the user interface 513 in response to the paste operation. In the case of a URL, the pasted data can be displayed as a selectable interface element 1006. As the pasted data was inserted into the pasteboard by a different application, upon insertion of the pasteboard data, a pasteboard transparency notification 1005 can be displayed that indicates the application that is accessing the pasteboard to perform the paste operation (Notes) and the application that inserted the data into the pasteboard (Safari). To enable this functionality, pasteboard metadata is maintained that identifies the source application of the copy action that causes data to be inserted into the pasteboard. The pasteboard metadata can be created when an application inserts data into the clipboard and checked when an application attempts to access the pasteboard. The transparency notification can be presented according to this metadata.

Figure 11:
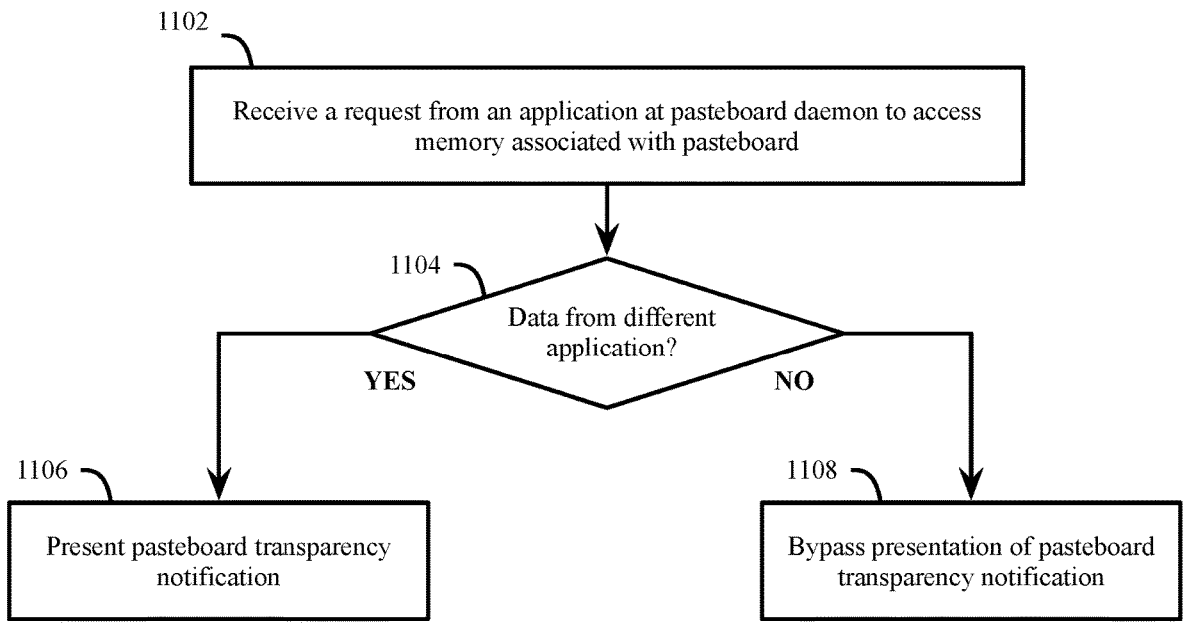
FIG. 11 illustrates a method of displaying a transparency notification for paste operations performed between different applications.

FIG. 11 illustrates a method 1100 of displaying a transparency notification for paste operations performed between different applications. The method 1100 includes for software logic on an electronic device to perform an operation to receive a request from an application at the pasteboard daemon to access memory associated with the pasteboard (1102). The software logic may be, for example, a pasteboard daemon 913 as in FIG. 9. The logic can determine whether the data in the pasteboard is data from a different application than the requesting application (1104). If the data is from a different application ("yes", 1104) the logic can present the pasteboard transparency notification (1106). If the data is not from a different application ("no", 1104), the logic can bypass presentation of the pasteboard transparency notification (1108).

In various embodiments, transparency notifications can be performed in conjunction with or in place of the user of a verified UI element for other functions provided by the electronic device. For example, a notification or indication can be displayed when an application is granted access to location data. A notification can also be displayed when attribution data is transmitted in response to selection of an advertisement.

Modification of UI Elements Based on Pasteboard Data

In one embodiment, different paste operations can be presented based on a detected pattern of data within the pasteboard. Pattern determination of pasteboard data can be performed by an application without causing the triggering of a transparency notification.

Figure 12:
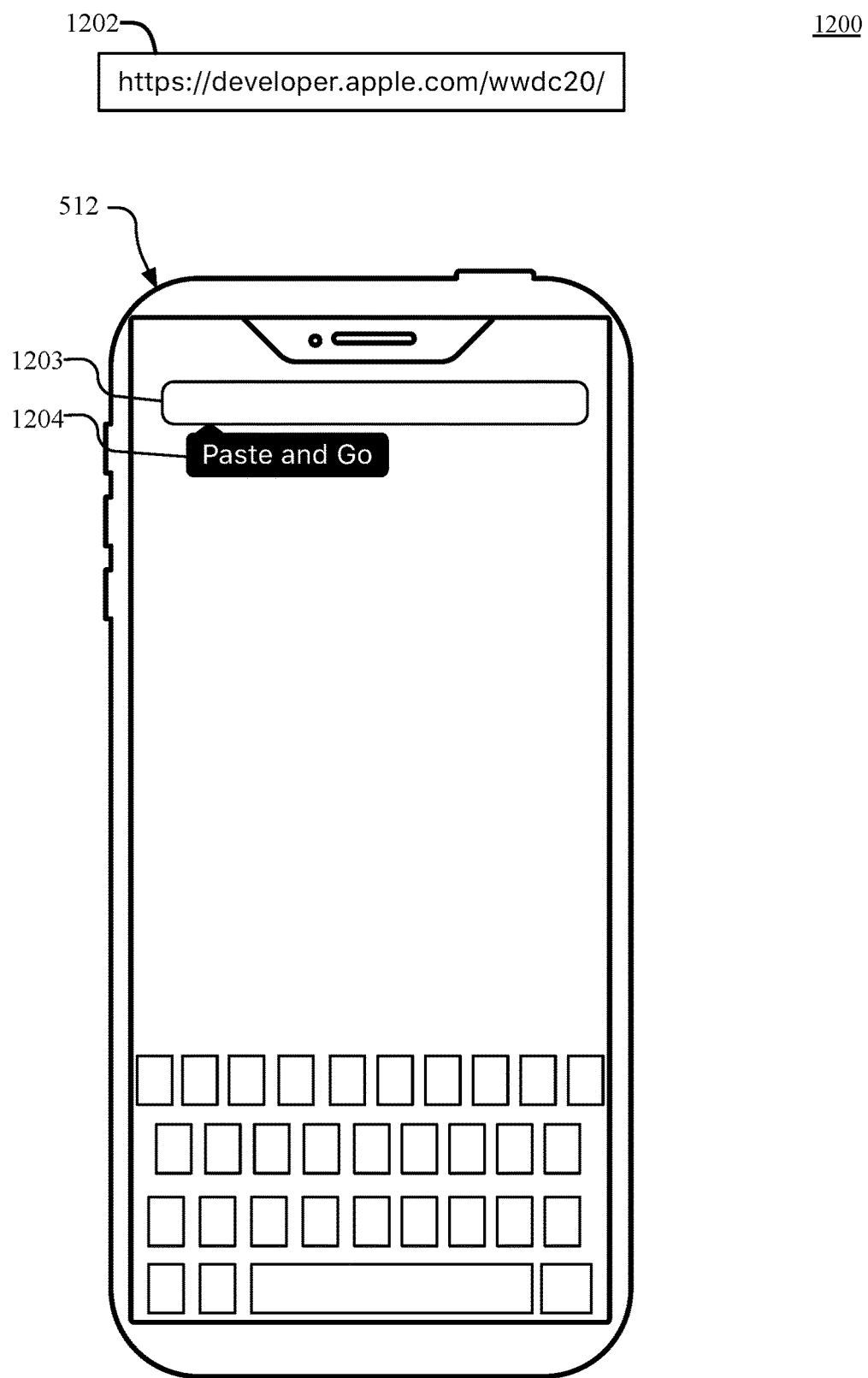
FIG. 12 illustrates a system in which an application can present different paste options based on the pattern of data within the pasteboard.

FIG. 12 illustrates a system 1200 in which an application can present different paste options based on the pattern of data within the pasteboard. For example, pasteboard memory 1202 can include data that is patterned as a URL (e.g., https://developer.apple.com/wwdc20/). An application, such as a web browser application, can detect the URL pattern in the pasteboard memory and in response to an input gesture at a search and/or address bar 1203 of the application, can present a UI element 1204 that enables a Paste and Go operation. The Paste and Go operation will insert the URL in the pasteboard and cause the web browser to load the web page identified by the URL. Other types of pattern specific operations may be enabled, such as a Paste and Search operation, which will perform a web searched based on data within the pasteboard. In one embodiment, the Paste and Search operation may be performed if the data within the pasteboard has a search query pattern. Applications other than web browser applications can also analyze the data pattern of pasteboard data to adjust the type of paste UI elements to present and/or determine whether to present a paste UI element at all. For example, some applications may only support the pasting of certain types of data (e.g., image data, files, audio data, numerical values, etc.). Such applications may not present a paste UI element if the data in the pasteboard does not match the expected pattern.

Where in previous implementations the applications may have performed the pasteboard pattern analysis themselves, reading pasteboard data that was pasted by a different application may trigger a spurious pasteboard transparency notice, as data in the pasteboard is being accessed, but not actually being pasted into the target application. To avoid this issue, embodiments described herein provide API interfaces to enable an application to request operating system logic to perform pattern analysis on pasteboard data and return data to indicate of one of the expected data patterns was detected within pasteboard data.

Figure 13:
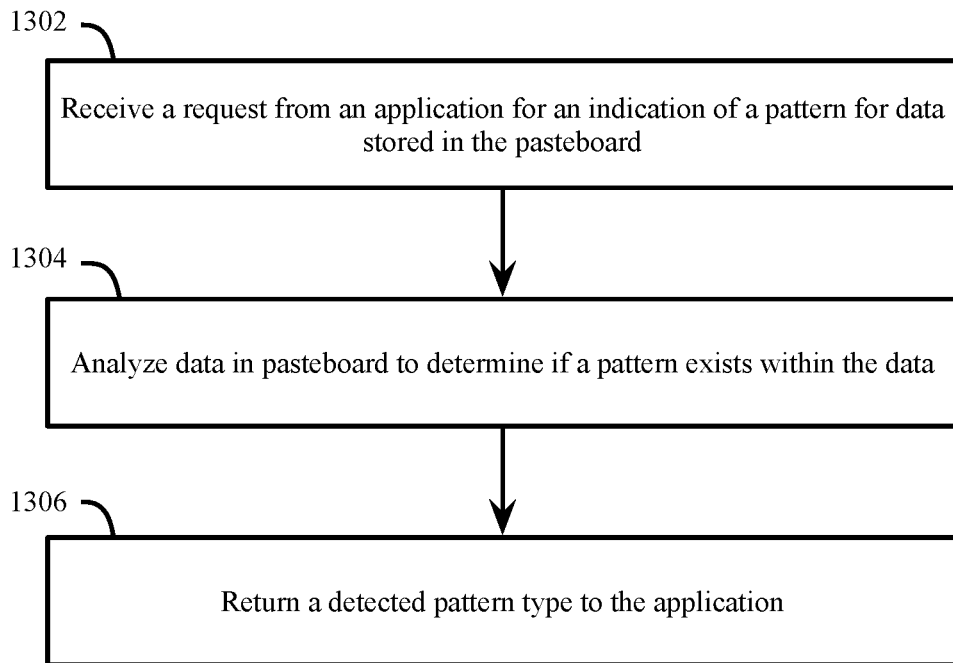
FIG. 13 illustrates a method to return a detected pattern type to a requesting application.

FIG. 13 illustrates a method 1300 to return a detected pattern type to a requesting application. According to method 1300, software logic associated with an operating system, such as logic within or associated with the pasteboard daemon, can receive a request from an application for an indication of a pattern for data stored in the pasteboard (1302). The logic can then analyze the data in the pasteboard to determine if a pattern exists within the data (1304). In one embodiment the analysis logic is configured to determine if the data contains one or more patterns in a set of known patterns (e.g., URLs, search bar data, numerical values, etc.). The logic can then return a detected pattern type to the application (1306). In various embodiments, no pattern may be returned if a pattern is not detected, a generic pattern type may be returned, or an "unknown" pattern type may be returned. The requesting application can use the returned pattern type to determine the type of paste UI element to display to paste the pasteboard data.

Figure 14:
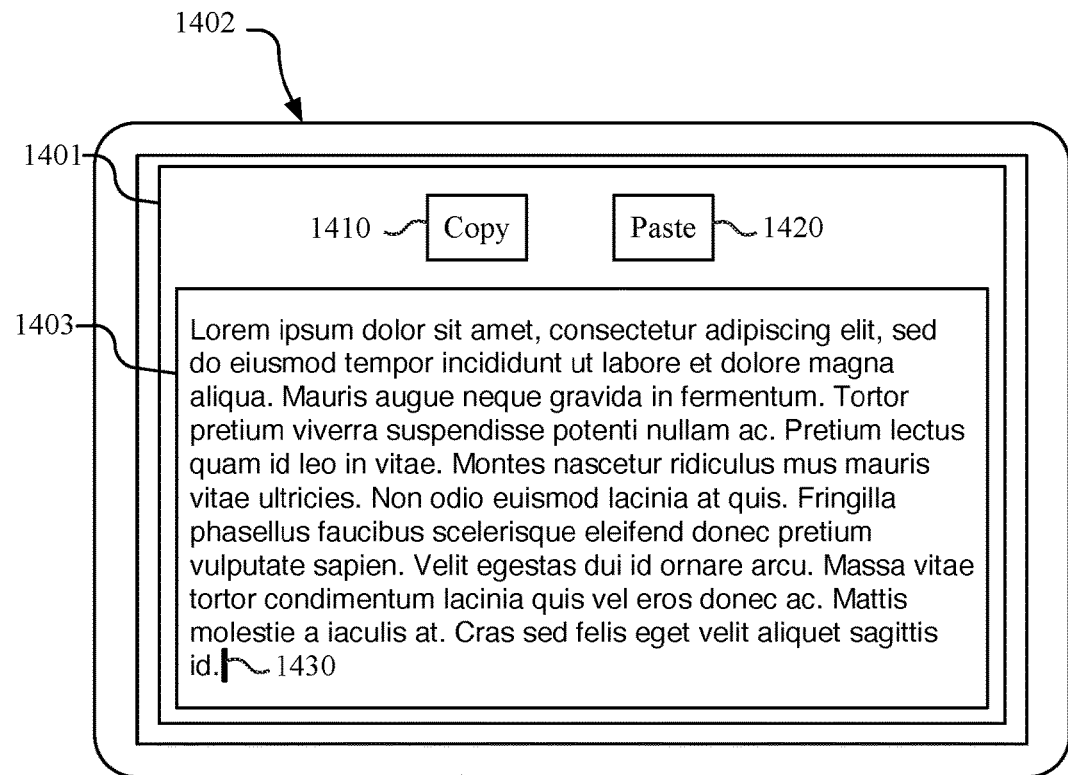
FIG. 14 illustrates a system of secure pasteboard access that is validated based on user input.
Figure 14:
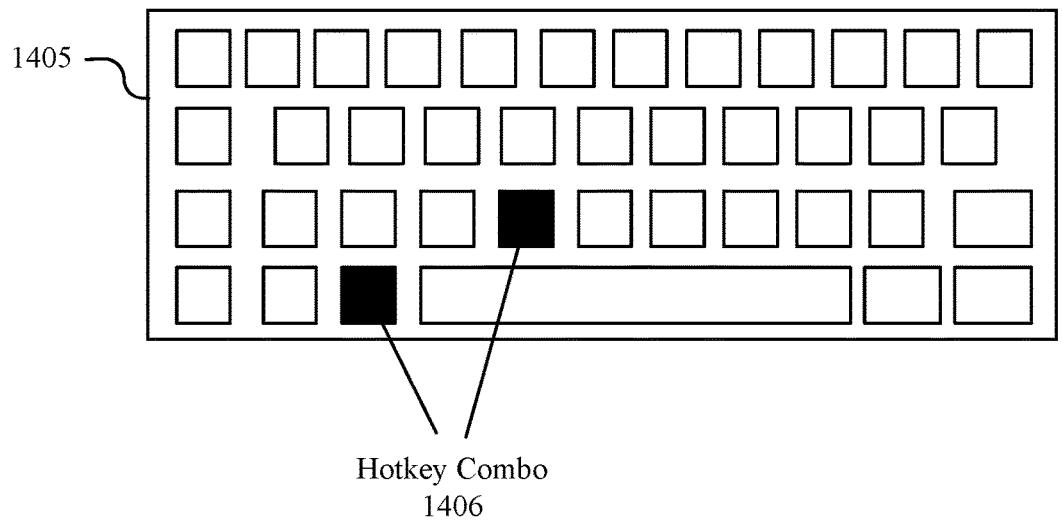

FIG. 14 illustrates a system 1400 of secure pasteboard access that is validated based on user input. System 1400 includes an electronic device 1402, which can be physically or wirelessly attached to an input device in the form of a physical keyboard 1405. Electronic device 1402 can execute an application that presents a user interface 1401 on the display of the electronic device 1402. The user interface 1401 can include an interface element 1410 that enables a copy operation and an interface element 1420 that enables a paste operation. The user interface 1401 can also include a text region 1403 into which text may be typed, copied, and pasted. The paste operation can be performed at a cursor location 1430 that is displayed in the text region 1403 of the user interface 1401. The interface element 1420 to perform the paste operation can be drawn by the application via the UI module 212 as described herein, either directly by the UI module 212 or via the pasteboard daemon 913 of FIG. 9. A paste operation via interface element 1420 from a different application can be performed via a secure paste API.

The secure paste API can also facilitate secure inter-application paste in response to a hotkey combination 1406 that is provided to the electronic device 1402 from the physical keyboard 1405. The hotkey combination 1406 can be registered with a source daemon 204 in a similar manner as the registration of a verified UI element. When a registered hotkey combination is received by the source daemon 204, a message is transmitted that includes data (e.g., authentication token, signature, etc.) that can be verified by a verifier daemon before access is provided to pasteboard memory, or other protected functions of the electronic device (e.g., location data, advertisement attribution data, etc.).

Exemplary API and Data Processing Systems

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 15:
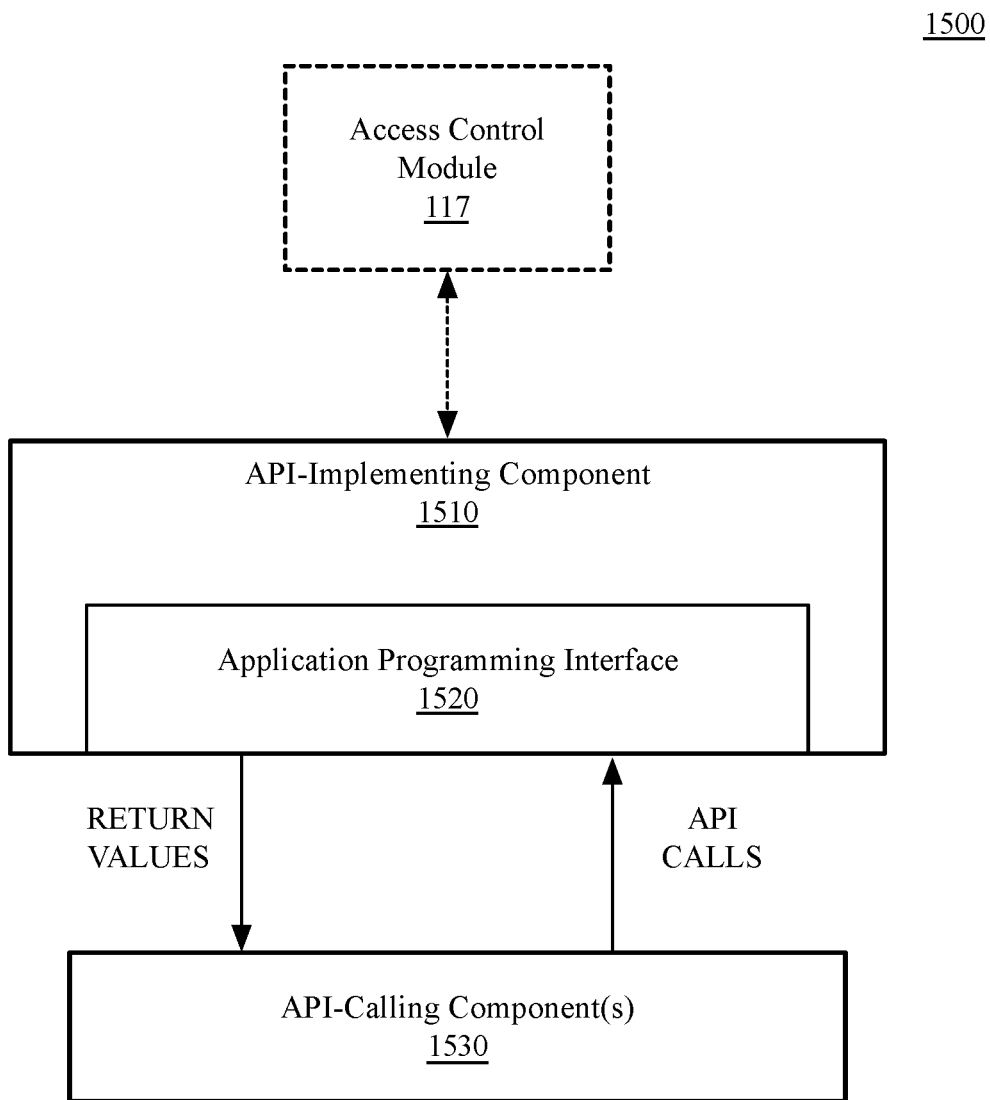
FIG. 15 is a block diagram illustrating an exemplary API architecture, which may be used in some embodiments.

FIG. 15 is a block diagram illustrating an exemplary API architecture, which may be used in some embodiments of the invention. As shown in FIG. 15, the API architecture 1500 includes the API-implementing component 1510 (e.g., an operating system, a library, a device driver, an API, an application program, software or other module) that implements the API 1520. The API 1520 specifies one or more functions, methods, classes, objects, protocols, data structures, formats and/or other features of the API-implementing component that may be used by the API-calling component 1530. The API 1520 can specify at least one calling convention that specifies how a function in the API-implementing component receives parameters from the API-calling component and how the function returns a result to the API-calling component. The API-calling component 1530 (e.g., an operating system, a library, a device driver, an API, an application program, software or other module), makes API calls through the API 1520 to access and use the features of the API-implementing component 1510 that are specified by the API 1520. The API-implementing component 1510 may return a value through the API 1520 to the API-calling component 1530 in response to an API call.

It will be appreciated that the API-implementing component 1510 may include additional functions, methods, classes, data structures, and/or other features that are not specified through the API 1520 and are not available to the API-calling component 1530. It should be understood that the API-calling component 1530 may be on the same system as the API-implementing component 1510 or may be located remotely and accesses the API-implementing component 1510 using the API 1520 over a network. While FIG. 15 illustrates a single API-calling component 1530 interacting with the API 1520, it should be understood that other API-calling components, which may be written in different languages (or the same language) than the API-calling component 1530, may use the API 1520.

The API-implementing component 1510, the API 1520, and the API-calling component 1530 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

In one embodiment, the access control module 117 described herein can be communicatively coupled with the API-implementing component 1510 to mediate access to privacy related system resources such as the user data and system resources illustrated in FIG. 1. Before the API-implementing component 1510 can perform some operations, the API implementing component 1510 can communicate with the access control module 117 to determine if such operations can be performed.

Figure 16A:
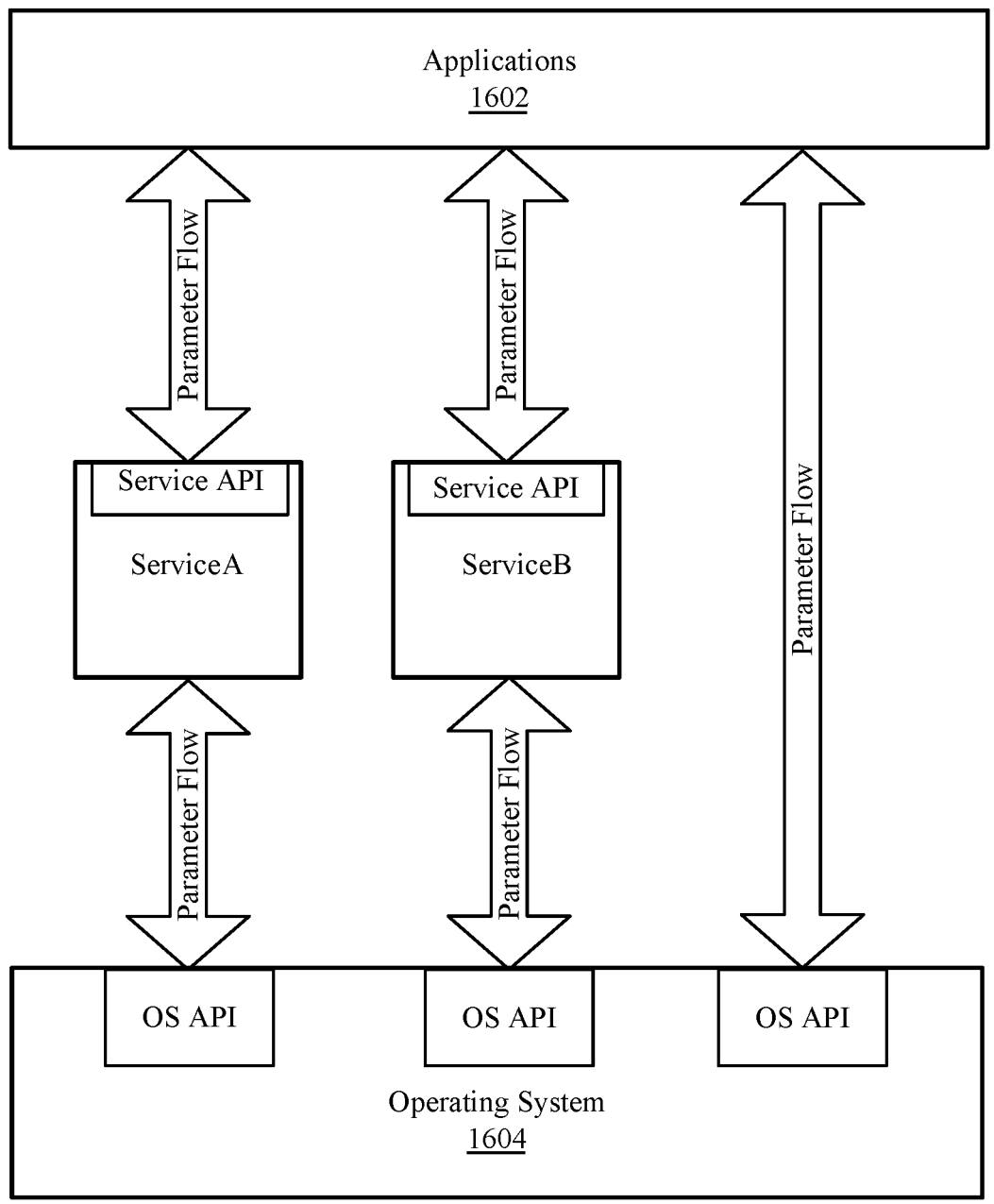
FIG. 16A-16B are block diagrams of exemplary API software stacks, according to embodiments.
Figure 16B:
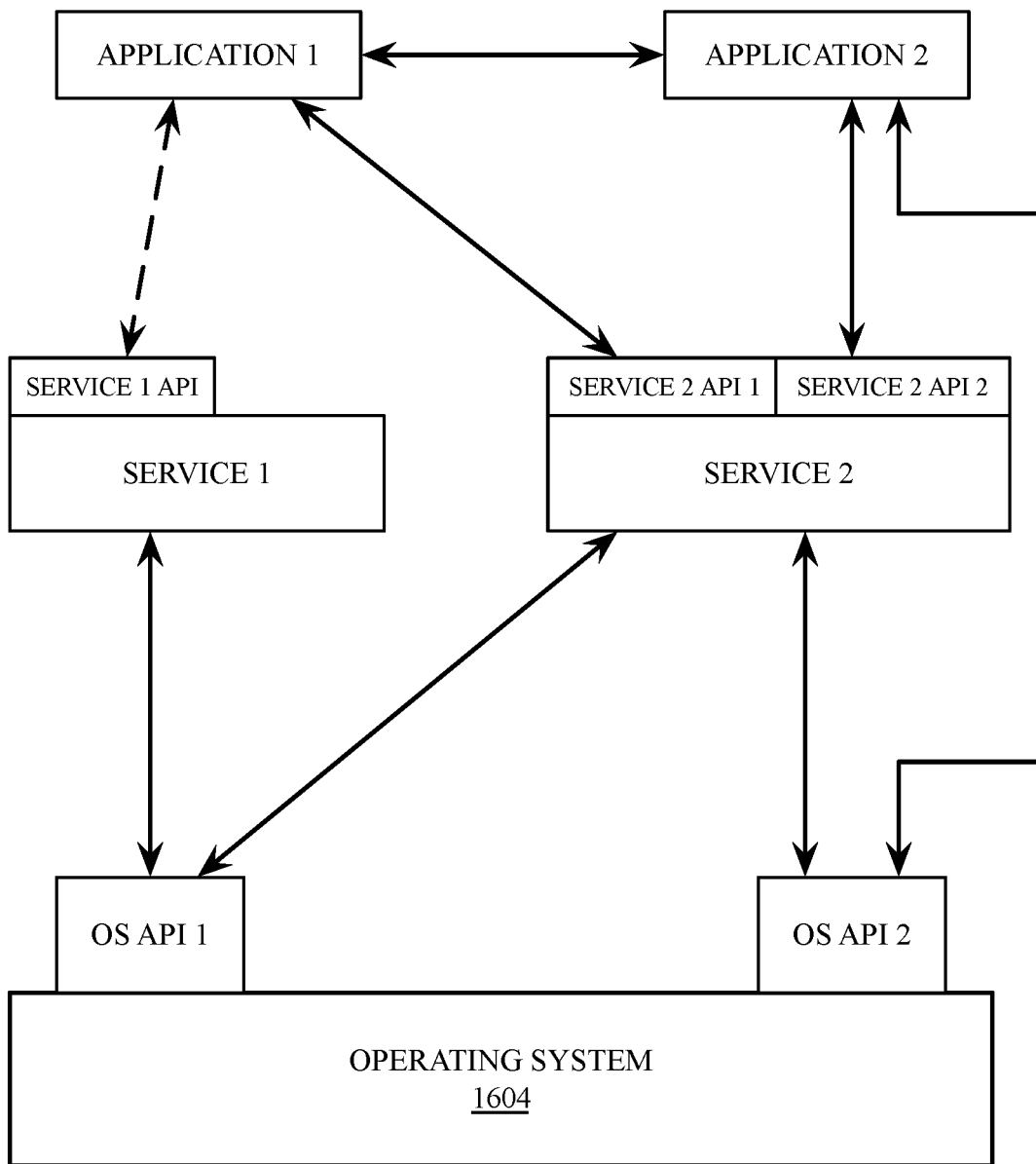

FIG. 16A-16B are block diagrams of exemplary API software stacks 1600, 1610, according to embodiments. FIG. 16A shows an exemplary API software stack 1600 in which applications 1602 can make calls to Service A or Service B using Service API and to Operating System 1604 using an OS API. Additionally, Service A and Service B can make calls to Operating System 1604 using several OS APIs.

FIG. 16B shows an exemplary API software stack 1610 including Application 1, Application 2, Service 1, Service 2, and Operating System 1604. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 17:
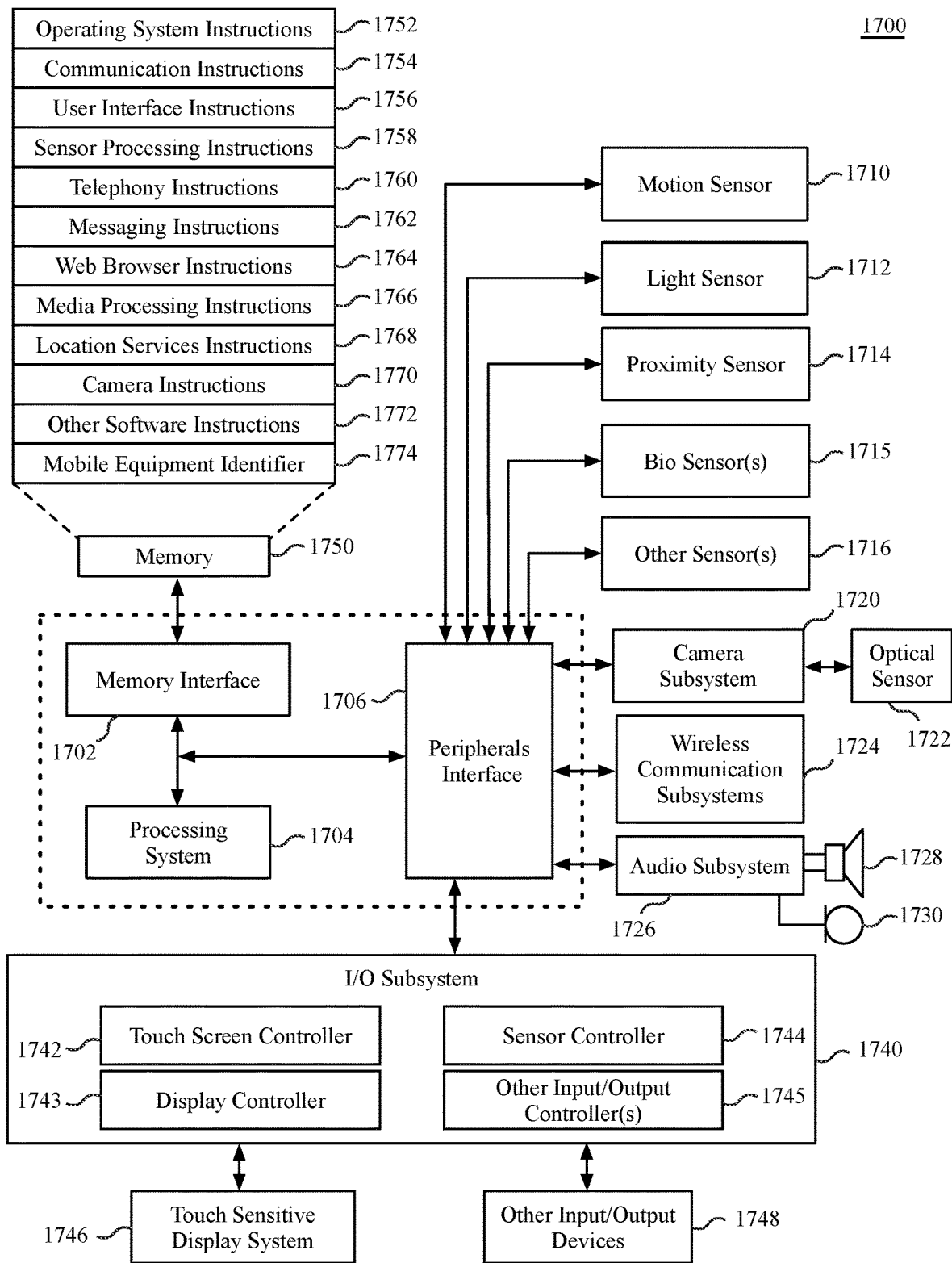
FIG. 17 is a block diagram of a device architecture for a mobile or embedded device, according to an embodiment.

FIG. 17 is a block diagram of a device architecture 1700 for a mobile or embedded device, according to an embodiment. The device architecture 1700 includes a memory interface 1702, a processing system 1704 including one or more data processors, image processors and/or graphics processing units, and a peripherals interface 1706. The various components can be coupled by one or more communication buses or signal lines. The various components can be separate logical components or devices or can be integrated in one or more integrated circuits, such as in a system on a chip integrated circuit.

The memory interface 1702 can be coupled to memory 1750, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1706 to facilitate multiple functionalities. For example, a motion sensor 1710, a light sensor 1712, and a proximity sensor 1714 can be coupled to the peripherals interface 1706 to facilitate the mobile device functionality. One or more biometric sensor(s) 1715 may also be present, such as a fingerprint scanner for fingerprint recognition or an image sensor for facial recognition. Other sensors 1716 can also be connected to the peripherals interface 1706, such as a positioning system (e.g., GPS receiver), a temperature sensor, or other sensing device, to facilitate related functionalities. A camera subsystem 1720 and an optical sensor 1722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1724, which can include radio frequency receivers and transmitters and/or optical (e.g., infrared) receivers and transmitters. The specific design and implementation of the wireless communication subsystems 1724 can depend on the communication network(s) over which a mobile device is intended to operate. For example, a mobile device including the illustrated device architecture 1700 can include wireless communication subsystems 1724 designed to operate over a GSM network, a CDMA network, an LTE network, a Wi-Fi network, a Bluetooth network, or any other wireless network. In particular, the wireless communication subsystems 1724 can provide a communications mechanism over which a media playback application can retrieve resources from a remote media server or scheduled events from a remote calendar or event server.

An audio subsystem 1726 can be coupled to a speaker 1728 and a microphone 1730 to facilitate voice-enabled functions, such as voice recognition, voice replication, digital recording, and telephony functions. In smart media devices described herein, the audio subsystem 1726 can be a high-quality audio subsystem including support for virtual surround sound.

The I/O subsystem 1740 can include a touch screen controller 1742 and/or other input controller(s) 1745. For computing devices including a display device, the touch screen controller 1742 can be coupled to a touch sensitive display system 1746 (e.g., touch-screen). The touch sensitive display system 1746 and touch screen controller 1742 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1746. Display output for the touch sensitive display system 1746 can be generated by a display controller 1743. In one embodiment, the display controller 1743 can provide frame data to the touch sensitive display system 1746 at a variable frame rate.

In one embodiment, a sensor processor 1744 is included to monitor, control, and/or processes data received from one or more of the motion sensor 1710, light sensor 1712, proximity sensor 1714, or other sensors 1716. The sensor processor 1744 can include logic to interpret sensor data to determine the occurrence of one of more motion events or activities by analysis of the sensor data from the sensors. In one embodiment the sensor processor 1744 also manages the camera subsystem 1720 and audio subsystem 1726, with couple with the sensor processor 1744 via the peripherals interface 1706. Multimedia captured by the camera subsystem 1720 and/or audio subsystem 1726 may be relayed to the memory 1750 to be accessed by software executing on the processing system 1704, or processed by the sensor processor 1744 or other processors in the system to determine environmental metadata. In one embodiment, the sensor processor may configure a live audio stream to a hearing-aid device or wireless earbuds that are connected via a wireless processor, enabling the audio stream to bypass the processing system 1704 and memory 1750.

In one embodiment, the I/O subsystem 1740 includes other input controller(s) 1745 that can be coupled to other input/control devices 1748, such as one or more buttons, rocker switches, thumb-wheel, infrared port, USB port, and/or a pointer device such as a stylus, or control devices such as an up/down button for volume control of the speaker 1728 and/or the microphone 1730.

In one embodiment, the memory 1750 coupled to the memory interface 1702 can store instructions for an operating system 1752, including portable operating system interface (POSIX) compliant and non-compliant operating system or an embedded operating system. The operating system 1752 may include instructions for handling basic system services and for performing hardware dependent tasks. In some implementations, the operating system 1752 can be a kernel.

The memory 1750 can also store communication instructions 1754 to facilitate communicating with one or more additional devices, one or more computers and/or one or more servers, for example, to retrieve web resources from remote web servers. The memory 1750 can also include user interface instructions 1756, including graphical user interface instructions to facilitate graphic user interface processing.

Additionally, the memory 1750 can store sensor processing instructions 1758 to facilitate sensor-related processing and functions; telephony instructions 1760 to facilitate telephone-related processes and functions; messaging instructions 1762 to facilitate electronic-messaging related processes and functions; web browser instructions 1764 to facilitate web browsing-related processes and functions; media processing instructions 1766 to facilitate media processing-related processes and functions; location services instructions including GPS and/or navigation instructions 1768 and Wi-Fi based location instructions to facilitate location based functionality; camera instructions 1770 to facilitate camera-related processes and functions; and/or other software instructions 1772 to facilitate other processes and functions, e.g., security processes and functions, and processes and functions related to the systems. The memory 1750 may also store other software instructions such as web video instructions to facilitate web video-related processes and functions; and/or web shopping instructions to facilitate web shopping-related processes and functions. In some implementations, the media processing instructions 1766 are divided into audio processing instructions and video processing instructions to facilitate audio processing-related processes and functions and video processing-related processes and functions, respectively. A mobile equipment identifier, such as an International Mobile Equipment Identity (IMEI) 1774 or a similar hardware identifier can also be stored in memory 1750.

Each of the above identified instructions and applications can correspond to a set of instructions for performing one or more functions described above. These instructions need not be implemented as separate software programs, procedures, or modules. The memory 1750 can include additional instructions or fewer instructions. Furthermore, various functions may be implemented in hardware and/or in software, including in one or more signal processing and/or application specific integrated circuits.

Figure 18:
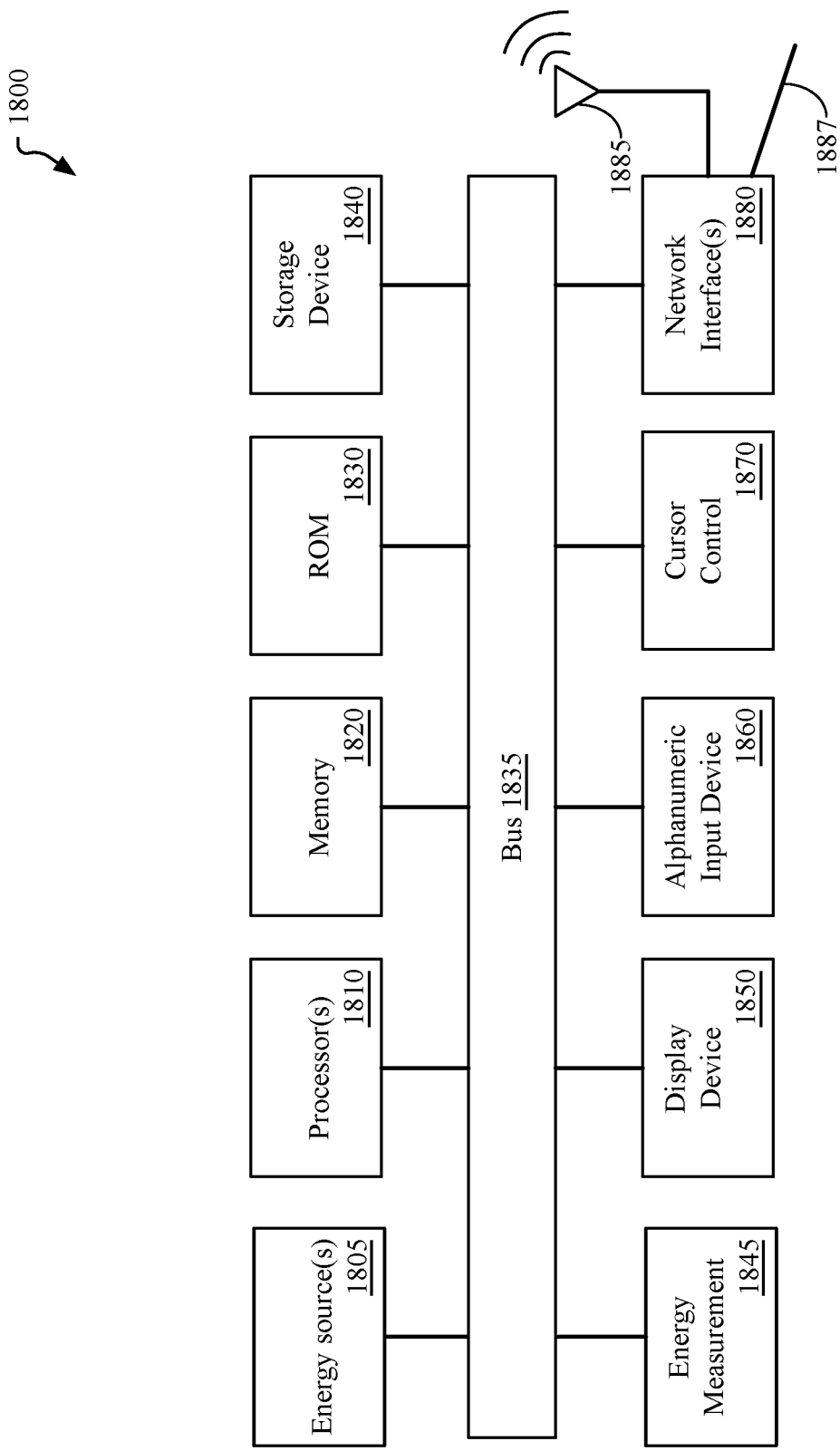
FIG. 18 is a block diagram of a computing system, according to an embodiment.

FIG. 18 is a block diagram of a computing system 1800, according to an embodiment. The illustrated computing system 1800 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1800 can be used to provide the computing device and/or a server device to which the computing device may connect.

The computing system 1800 includes bus 1835 or other communication device to communicate information, and processor(s) 1810 coupled to bus 1835 that may process information. While the computing system 1800 is illustrated with a single processor, the computing system 1800 may include multiple processors and/or co-processors. The computing system 1800 further may include memory 1820, which can be random access memory (RAM) or other dynamic storage device coupled to the bus 1835. The memory 1820 may store information and instructions that may be executed by processor(s) 1810. The memory 1820 may also be used to store temporary variables or other intermediate information during execution of instructions by the processor(s) 1810.

The computing system 1800 may also include read only memory (ROM) 1830 and/or another data storage device 1840 coupled to the bus 1835 that may store information and instructions for the processor(s) 1810. The data storage device 1840 can be or include a variety of storage devices, such as a flash memory device, a magnetic disk, or an optical disc and may be coupled to computing system 1800 via the bus 1835 or via a remote peripheral interface.

The computing system 1800 may also be coupled, via the bus 1835, to a display device 1850 to display information to a user. The computing system 1800 can also include an alphanumeric input device 1860, including alphanumeric and other keys, which may be coupled to bus 1835 to communicate information and command selections to processor(s) 1810. Another type of user input device includes a cursor control 1870 device, such as a touchpad, a mouse, a trackball, or cursor direction keys to communicate direction information and command selections to processor(s) 1810 and to control cursor movement on the display device 1850. The computing system 1800 may also receive user input from a remote device that is communicatively coupled via one or more network interface(s) 1880.

The computing system 1800 further may include one or more network interface(s) 1880 to provide access to a network, such as a local area network. The network interface(s) 1880 may include, for example, a wireless network interface having antenna 1885, which may represent one or more antenna(e). The computing system 1800 can include multiple wireless network interfaces such as a combination of Wi-Fi, Bluetooth®, near field communication (NFC), and/or cellular telephony interfaces. The network interface(s) 1880 may also include, for example, a wired network interface to communicate with remote devices via network cable 1887, which may be, for example, an Ethernet cable, a coaxial cable, a fiber optic cable, a serial cable, or a parallel cable.

In one embodiment, the network interface(s) 1880 may provide access to a local area network, for example, by conforming to IEEE 802.18 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1880 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1800 can further include one or more energy sources 1805 and one or more energy measurement systems 1845. Energy sources 1805 can include an AC/DC adapter coupled to an external power source, one or more batteries, one or more charge storage devices, a USB charger, or other energy source. Energy measurement systems include at least one voltage or amperage measuring device that can measure energy consumed by the computing system 1800 during a predetermined period of time. Additionally, one or more energy measurement systems can be included that measure, e.g., energy consumed by a display device, cooling subsystem, Wi-Fi subsystem, or other frequently used or high-energy consumption subsystem.

As described above, one aspect of the present technology is the gathering and use of data available from specific and legitimate sources to improve user experience with respect to granting access to protected resources on a data processing system. The present disclosure contemplates that in some instances, this gathered data may include personal information data regarding application usage patterns for a user. The gathering of such application usage patterns may also inadvertently reveal other information that may be used to uniquely identify the user, such as demographic data, location-based data, online identifiers, telephone numbers, email addresses, home addresses, data or records relating to a user's health or level of fitness (e.g., vital signs measurements, medication information, exercise information), date of birth, or any other personal information. The present disclosure recognizes that the use of such personal information data, in the present technology, can be used to the benefit of users, for example, to improve the user experience with performing tasks using a data processing system or computing device described herein.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during system configuration or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

One embodiment provides a method comprising displaying, via a display of an electronic device, a user interface element corresponding to a function of a process executing on one or more processors of the electronic device and receiving an indication of an interaction with the user interface element. The method further includes, in response to receiving the indication and in accordance with a determination that the indication corresponds to a hardware input event, sending, by a first component of the electronic device, an authentication token to a second component of the electronic device, verifying, by the second component, that the authentication token is valid, and after verifying that the authentication token is valid, initiating execution of the function.

Further as to the method above, the first component can be a first daemon associated with an operating system of the electronic device and the second component can be a second daemon associated with the operating system of the electronic device. The second component can be the process executing on the one or more processors of the electronic device. In one embodiment, in response to verifying that the authentication token is valid, the method can additionally include sending, by the second component to the process, an indication that the authentication token is valid. The first component can generate the authentication token using cryptographic material provided by the second component and send, with the authentication token, a timestamp associated with the authentication token. Verifying that the authentication token is valid includes generating a second authentication token using the timestamp. Additionally, the second component can provide the cryptographic material during registration of the user interface element. Registration of the user interface element includes designating, to the first component, the user interface element as indicating approval to execute the function. The method can additionally include presenting an indication of execution of the function. The indication can include a notification that is displayed on a user interface of the electronic device or another indication to the user that a protected function has been performed.

In various embodiments, the protected function can include accessing data stored in a memory buffer configured as a clipboard or pasteboard by an operating system of the electronic device, sending advertisement attribution data in response to selection of an advertisement displayed by the process, or sending location information associated with the electronic device.

One embodiment provides a non-transitory machine-readable medium storing instructions which, when executed by one or more processors, cause the one or more processors to perform operations comprising displaying, via a display of an electronic device, a user interface element corresponding to a function of a process executing on one or more processors of the electronic device and receiving an indication of an interaction with the user interface element. The operations further include, in response to receiving the indication and in accordance with a determination that the indication corresponds to a hardware input event, sending, by a first component of the electronic device, an authentication token to a second component of the electronic device, verifying, by the second component, that the authentication token is valid, and after verifying that the authentication token is valid, initiating execution of the function.

One embodiment provides a data processing system on an electronic device, the system comprising a display, a memory device, and one or more processors coupled with the memory device and the display. The one or more processors are configured to execute instructions stored in the memory device. The instructions cause the one or more processors to perform operations to display, via the display, a user interface element corresponding to a function of a process executed by the one or more processors, receive an indication of an interaction with the user interface element, and in response to receipt of the indication: in accordance with a determination that the indication corresponds to a hardware input event, send, by a first component of the electronic device, an authentication token to a second component of the electronic device, verify, by the second component, that the authentication token is valid, and after verification that the authentication token is valid, initiate execution of the function. One embodiment provides a non-transitory machine-readable medium storing instructions which, when executed by one or more processors of an electronic device, cause the one or more processors to perform operations comprising receiving a hardware event associated with an input device, determining that the hardware event is associated with a request to access data stored in a memory buffer configured as a clipboard or pasteboard by an operating system of the electronic device, generating an authentication token to enable authenticated access to the memory buffer in response to determining that the hardware event is associated with the request to access a memory buffer, the authentication token generated at least in part based on a shared secret and a timestamp, triggering a software event to report an occurrence of the hardware event, the software event including the authentication token and the timestamp, receiving, from an application executed by the one or more processors of the electronic device, a request to access the data in the memory buffer, the request including the authentication token and the timestamp, validating the authentication token and the timestamp, and providing, to the application, data stored in the memory buffer in response to validating the authentication token and the timestamp.

In further embodiments, the operations additionally comprise, at a first software process, receiving the hardware event associated with the input device, determining that the hardware event is associated with the request to access the data stored in the memory buffer, generating the authentication token to enable authenticated access to the memory buffer, and triggering the software event to report an occurrence of the hardware event, the software event including the authentication token and the timestamp. The operations additionally comprise, at a second software process, receiving, from the application executed by the one or more processors of the electronic device, a request to access the data in the memory buffer, the request including the authentication token and the timestamp, validating the authentication token and the timestamp, and providing, to the application, the data stored in the memory buffer in response to validating the authentication token and the timestamp. The operations can further comprise generating or exchanging the shared secret via a privileged communication channel established via the first software process and the second software process. The hardware event can be an input event associated with a hardware input device, such as a touch event received from a touch input device, a click event received from a pointer device, or a keyboard hotkey received from a keyboard device. Determining that the hardware event is associated with the request to access the data stored in a memory buffer includes determining that the input event is associated with a user interface element configured to trigger a paste action, or another protected function described herein.

One embodiment provides a data processing system comprising a display, a memory device, and one or more processors coupled with the memory device and the display, the one or more processors to execute instructions stored in the memory device. The instructions cause the one or more processors to perform operations to receive a request from a first process executed by the one or more processors, wherein the request is a request to access memory associated with a pasteboard or clipboard and the first process is associated with an application executed by the one or more processors, determine, that the memory includes data that was placed into the memory by a second process executed by the one or more processors, the second process differing from the first process, wherein the determination is performed based on metadata associated with the data and the metadata is created in association with insertion of the data into the memory, and presenting a notification on the display in response to the determination. The notification can indicate that the first application has pasted data from the second application.

In a further embodiment, the instructions cause the one or more processors to perform operations to receive a request from the first application, the request for an indication of a pattern for data stored in the memory, analyze the data stored in the memory to determine whether a pattern exists within the data, and return a pattern type to the first application, the pattern type associated with a detected pattern within the data. Based on the pattern type detected within the data, the first application can adjust a paste interface element presented via the display. The pattern type can be a uniform resource locator, a numerical value pattern, or a search query pattern.

One embodiment provides a non-transitory machine-readable medium storing instructions to cause one or more processors to perform operations comprising preventing access to location services functionality provided by an electronic device, receiving a hardware input event corresponding with a user interface element presented on a display of the electronic device, where receipt of the hardware event at the user interface element is designated as an indication of approval to access the location services functionality, sending, by a first component of the electronic device, a message to indicate occurrence of the hardware input event, the message including an authentication token, verifying the authentication token at a recipient of the message, and enabling access to the location services functionality provided by the electronic device in response to verifying the authentication token.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A method comprising:
    receiving, on an electronic device, a request from an application to access a location service of the electronic device;
    determining whether access to the location service has been granted to the application;
    when access to the location service has not been granted to the application, displaying a verified user interface element to prompt for access to the location service to be granted to the application, the displaying comprising:
        receiving a request to provide the verified user interface element;
        identifying a user interface region that will contain the verified user interface element;
        registering, by a process separate from the application, the verified user interface element with a verified process; and
        rendering, by the process separate from the application, the verified user interface element in an identified user interface region; and
    in response to a determination that a hardware event is associated with a selection of the verified user interface element, granting access to the location service to the application.

2. The method of claim 1, further comprising:
    when access to the location service has been granted to the application, allowing the application to access the location service.

3. The method of claim 1, wherein the verified user interface element is rendered, by the process separate from the application, within a user interface of the application.

4. The method of claim 1, wherein the determination that the hardware event is associated with the selection of the verified user interface element comprises:
triggering, by the verified process that detected the hardware event, a software event including verification data in response to detection of the hardware event associated with the selection of the verified user interface element, wherein the verified process is separate from the process and the application.

5. The method of claim 4, wherein the verification data comprises at least one of an authentication token or a signature included with the software event.

6. The method of claim 5, wherein the signature is associated with a generator of the software event.

7. A non-transitory machine-readable medium comprising instructions that, when executed by one or more processors, cause the one or more processors to perform operations comprising:
receiving, on an electronic device, a request from an application to access a location service of the electronic device;
determining whether access to the location service has been granted to the application;
when access to the location service has not been granted to the application, displaying a verified user interface element to prompt for access to the location service to be granted to the application, the displaying comprising:
receiving a request to provide the verified user interface element;
identifying a user interface region that will contain the verified user interface element;
registering, by a process separate from the application, the verified user interface element with a verified process; and
rendering, by the process separate from the application, the verified user interface element in an identified user interface region; and
in response to a determination that a hardware event is associated with a selection of the verified user interface element, granting access to the location service to the application.

8. The non-transitory machine-readable medium of claim 7, wherein the operations further comprise:
when access to the location service has been granted to the application, allowing the application to access the location service.

9. The non-transitory machine-readable medium of claim 7, wherein displaying the verified user interface element further comprises:
sending a notice to identify the user interface region that will contain the verified user interface element.

10. The non-transitory machine-readable medium of claim 9, wherein the notice identifies the verified user interface element by a user interface element identifier.

11. The non-transitory machine-readable medium of claim 9, wherein the verified user interface element is rendered, by the process separate from the application, within a user interface of the application.

12. The non-transitory machine-readable medium of claim 7, wherein the determination that the hardware event is associated with the selection of the verified user interface element comprises:
triggering a software event including verification data in response to the hardware event associated with the selection of the verified user interface element.

13. The non-transitory machine-readable medium of claim 12, wherein the verification data comprises at least one of an authentication token or a signature included with the software event.

14. The non-transitory machine-readable medium of claim 13, wherein the signature is associated with a generator of the software event.

15. A device comprising:
a memory; and
at least one processor configured to:
receive a request from an application to access a location service on the device;
determine whether access to the location service has been granted to the application;
when access to the location service has not been granted to the application, display a verified user interface element to prompt for access to the location service to be granted to the application, the display comprising:
receiving a request to provide the verified user interface element;
identifying a user interface region that will contain the verified user interface element;
registering, by a process separate from the application, the verified user interface element with a verified process; and
rendering, by the process separate from the application, the verified user interface element in an identified user interface region; and
in response to a determination that a hardware event is associated with a selection of the verified user interface element, grant access to the location service to the application.

16. The device of claim 15, wherein the at least one processor is further configured to:
when access to the location service has been granted to the application, allow the application to access the location service.

17. The device of claim 15, wherein the verified user interface element is rendered, by the process separate from the application, within a user interface of the application.

18. The device of claim 15, wherein the determination that the hardware event is associated with the selection of the verified user interface element comprises:
triggering a software event including verification data in response to the hardware event associated with the selection of the verified user interface element.

19. The device of claim 18, wherein the verification data comprises at least one of an authentication token or a signature included with the software event.

20. The device of claim 19, wherein the signature is associated with a generator of the software event.

\* \* \* \* \*